US012793420B2

(12) United States Patent
Rubery et al.

(10) Patent No.: US 12,793,420 B2
(45) Date of Patent: Nov. 10, 2026

(54) DYNAMIC PROMINENCE OF VIDEO STREAMS DURING INCIDENT RESPONSE

(71) Applicant: Zoom Video Communications, Inc., San Jose, CA (US)

(72) Inventors: Dennis Paul Rubery, Pittsford, NY (US); Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 749 days.

(21) Appl. No.: 17/977,855

(22) Filed: Oct. 31, 2022

(65) Prior Publication Data

US 2024/0144680 A1 May 2, 2024

(51) Int. Cl.
*G10L 15/02* (2006.01)
*G06V 20/40* (2022.01)
*H04L 12/18* (2006.01)

(52) U.S. Cl.
CPC .............. *G06V 20/44* (2022.01); *G10L 15/02* (2013.01); *H04L 12/1822* (2013.01); *H04L 12/1831* (2013.01)

(58) Field of Classification Search
CPC ..... G06V 20/44; G10L 15/02; H04L 12/1822; H04L 12/1831
USPC ................................................. 382/190, 103
See application file for complete search history.

(56) References Cited

U.S. PATENT DOCUMENTS 5,625,410 A * 4/1997 Washino .................. H04N 7/10 348/E7.086
9,342,976 B2 5/2016 Pfeffer
10,075,672 B2 9/2018 Pell
11,165,989 B2 * 11/2021 Trenh ..................... H04N 7/147
(Continued)

FOREIGN PATENT DOCUMENTS

JP H07298241 A 11/1995
WO 2017155466 A1 9/2017

OTHER PUBLICATIONS

D. Abrams and S. McDowall, "Video Content Analysis with Effective Response," 2007 IEEE Conference on Technologies for Homeland Security, Woburn, MA, USA, 2007, pp. 57-63, doi: 10.1109/THS.2007.370020. (Year: 2007).*
(Continued)

*Primary Examiner* — Jennifer Mehmood
*Assistant Examiner* — Eric James Shoemaker
(74) *Attorney, Agent, or Firm* — Kilpatrick Townsend & Stockton LLP

(57) ABSTRACT

Systems and methods for providing dynamic prominence are provided herein. In an aspect, a method may include establishing, by a video conference provider, an incident identification system and determining, by the video conference provider, client devices associated with the incident identification system. The method may also include joining, by the video conference provider, one or more of the client devices to an identification session and receiving, by the video conference provider, at least one multimedia stream from each of the one or more client devices. The method may also include determining, by the video conference provider, a relevant multimedia stream from the received multimedia streams and transmitting, by the video conference provider, an indication to increase a prominence of the relevant multimedia stream during the identification session.

20 Claims, 17 Drawing Sheets

(56) References Cited

U.S. PATENT DOCUMENTS

| | | | | |
|---|---|---|---|---|
| 11,343,293 | B1 * | 5/2022 | Slotznick | H04N 5/272 |
| 12,250,253 | B2 | 3/2025 | Rubery et al. | |
| 12,388,883 | B2 | 8/2025 | Rubery | |
| 2008/0309761 | A1 * | 12/2008 | Kienzle | G08B 13/194 348/143 |
| 2008/0318564 | A1 | 12/2008 | Kreiner et al. | |
| 2010/0037151 | A1 | 2/2010 | Ackerman et al. | |
| 2013/0038728 | A1 | 2/2013 | Kim | |
| 2013/0314542 | A1 * | 11/2013 | Jackson | H04N 5/76 348/143 |
| 2015/0039760 | A1 | 2/2015 | Yoakum | |
| 2015/0204109 | A1 | 7/2015 | Ergenbright | |
| 2016/0192166 | A1 * | 6/2016 | deCharms | H04N 7/148 348/14.02 |
| 2017/0169699 | A1 | 6/2017 | Will et al. | |
| 2017/0280098 | A1 | 9/2017 | Sethuraman et al. | |
| 2018/0084100 | A1 | 3/2018 | Chockalingam | |
| 2018/0253954 | A1 * | 9/2018 | Verma | G08B 25/08 |
| 2018/0316893 | A1 | 11/2018 | Rosenberg et al. | |
| 2019/0237204 | A1 | 8/2019 | Huang | |
| 2019/0356703 | A1 * | 11/2019 | Rosenberg | H04L 65/403 |
| 2020/0242718 | A1 | 7/2020 | Owens et al. | |
| 2020/0322038 | A1 | 10/2020 | Mills et al. | |
| 2021/0012115 | A1 * | 1/2021 | Bodbyl | G06V 20/176 |
| 2021/0037368 | A1 | 2/2021 | Pellegrini et al. | |
| 2021/0048829 | A1 | 2/2021 | Deyle et al. | |
| 2021/0209932 | A1 * | 7/2021 | Olds | H04L 65/403 |
| 2023/0089720 | A1 | 3/2023 | Whitaker et al. | |
| 2023/0144781 | A1 | 5/2023 | Han | |
| 2024/0048655 | A1 | 2/2024 | Zajac et al. | |
| 2024/0144680 | A1 | 5/2024 | Rubery et al. | |
| 2024/0144681 | A1 | 5/2024 | Rubery et al. | |
| 2024/0144682 | A1 | 5/2024 | Rubery et al. | |
| 2024/0146777 | A1 | 5/2024 | Rubery et al. | |
| 2024/0146778 | A1 | 5/2024 | Rubery et al. | |
| 2024/0146785 | A1 | 5/2024 | Rubery | |

OTHER PUBLICATIONS

"Use Zoom for the Incident Command Center", Available online at: https://web.archive.org/web/20210411102951/https://support.atlassian.com/opsgenie/docs/use-zoom-for-the-incident-command-center/, Apr. 11, 2021, pp. 1-2.

U.S. Appl. No. 17/977,611, "Final Office Action", Mar. 25, 2024, 13 pages.

U.S. Appl. No. 17/977,611, "Non-Final Office Action", Aug. 14, 2024, 16 pages.

U.S. Appl. No. 17/977,611, "Non-Final Office Action", Aug. 23, 2023, 11 pages.

U.S. Appl. No. 17/977,611, "Notice of Allowance", Apr. 9, 2025, 5 pages.

U.S. Appl. No. 17/977,611, "Notice of Allowance", Dec. 27, 2024, 14 pages.

U.S. Appl. No. 17/977,611, "U.S. Patent Application No.", Oct. 31, 2022, 98 pages.

U.S. Appl. No. 17/977,623, "Final Office Action", Apr. 17, 2024, 14 pages.

U.S. Appl. No. 17/977,623, "Final Office Action", Feb. 18, 2025, 13 pages.

U.S. Appl. No. 17/977,623, "Non-Final Office Action", Aug. 8, 2024, 15 pages.

U.S. Appl. No. 17/977,623, "Non-Final Office Action", Jul. 15, 2025, 12 pages.

U.S. Appl. No. 17/977,623, "Non-Final Office Action", Jul. 7, 2023, 13 pages.

U.S. Appl. No. 17/977,623, "U.S. Patent Application No.", Oct. 31, 2022, 104 pages.

U.S. Appl. No. 17/977,637, "Final Office Action", May 24, 2024, 25 pages.

U.S. Appl. No. 17/977,637, "Non-Final Office Action", Jan. 8, 2024, 17 pages.

U.S. Appl. No. 17/977,637, "Notice of Allowance", Nov. 7, 2024, 7 pages.

U.S. Appl. No. 17/977,862, "Non-Final Office Action", Apr. 24, 2025, 28 pages.

U.S. Appl. No. 17/977,871, "Final Office Action", Aug. 22, 2025, 32 pages.

U.S. Appl. No. 17/977,871, "Non-Final Office Action", Mar. 7, 2025, 25 pages.

JPH07298241A, "Video Conference Equipment Having Remote Monitor Function", Google Patents, Kyocera Corp, Oct. 11, 1995, pp. 1-4.

U.S. Appl. No. 17/977,862 , Final Office Action, Mailed on Oct. 16, 2025, 29 pages.

U.S. Appl. No. 17/977,623, "Final Office Action", Feb. 5, 2026, 13 pages.

U.S. Appl. No. 17/977,862, "Non-Final Office Action", Feb. 23, 2026, 28 pages.

U.S. Appl. No. 17/977,871, "Non-Final Office Action", Jan. 28, 2026, 22 pages.

* cited by examiner

DYNAMIC PROMINENCE OF VIDEO STREAMS DURING INCIDENT RESPONSE

FIELD

The present application generally relates to video conferences and more particularly relates to systems and methods for providing an incident identification system. In some aspects, the present application relates to systems and methods for providing dynamic prominence during a virtual meeting or session. In still further aspects, the present application relates to systems and methods for providing identification of person(s) of interest.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
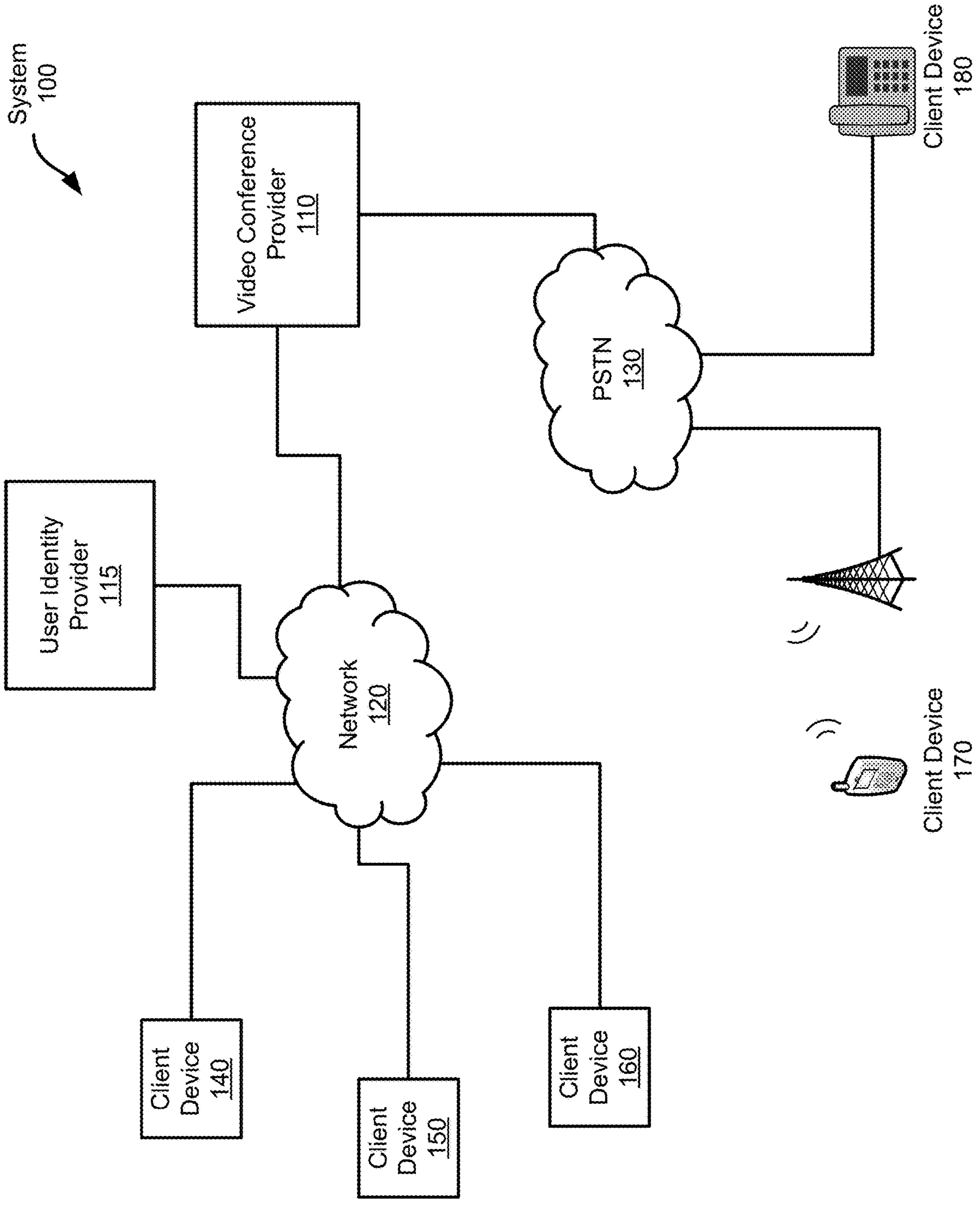
FIGS. 1, 2, and 3 show example systems for providing an incident identification system, according to an embodiment herein.

Examples are described herein in the context of systems and methods for providing an incident identification system, providing dynamic prominence during a virtual meeting/session, and providing identification of person(s) of interest. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Recent tragic events highlight the limits of first responder accessibility. As other areas of modern daily life become increasingly virtual and connected, many facilities and venues remain isolated and inaccessible via virtual means to first responders and aid. That is, incidents in facilities, whether the facility be places of worship, schools, universities, or businesses, present unique communication and situational awareness challenges to officials and first responders. Even when a facility has a dedicated security system, it may be difficult to access for officials and first responders, can have limited distribution capabilities, and rarely permits two-way communication between individuals outside of the facility and those inside.

A common problem for current security systems is that communications are often routed back to a central console or location at the facility, such as a locked room. Having a central console for security systems can be problematic in that the room housing the central console often is inadequately sized for a response team. Even if the security system allows for remote access, it is often difficult or impossible to grant access to officials and first responders during an incident. These access issues can be exacerbated during multi-agency responses, creating significant command and control challenges.

The above identified issues of present-day security systems often leave officials calling random phones within a facility hoping someone will answer, shouting down hallways, or using public address (PA) systems in the hopes of engaging the appropriate individuals within the facility. All of these issues result in slow and often insufficient response efforts by officials and first responders, which can lead to increased danger to individuals involved in an incident.

To provide a remote and dispersed access to officials and first responders that provides increased visibility and connectedness within a facility, systems and methods for an incident identification system are provided herein. Modern collaboration platforms, such as video conference platforms, aggregate and route numerous multimedia streams seamlessly to any connected endpoints, whether fixed or mobile. For example, video conference providers can enable people to interact with each other using their own computers (or "client devices") with both video and audio in a variety of settings, such as in one-on-one conversations, group meetings, and webinars. As described in greater detail with respect to the example systems and methods provided herein, the structure provided by video conference providers can be leveraged to provide officials and first responders diverse and remote access to facilities, including the ability to gain visual and audio access within a facility and participate in two-way communication with individuals of interest within the facility.

According to one embodiment, an incident identification system is provided. The incident identification system can utilize client devices distributed within a facility, including people's laptops, workstations, smartphones, conference rooms, and personal devices. If the client device is enrolled in an incident identification system, then the client device may be requested to join the identification session in the event of an incident, also referred to herein as "an incident event." Upon joining an incident identification session, the client device may be utilized to collect multimedia content. First responders may be able to activate the client device in an emergency situation to gather vital information regarding the vicinity around the client device. The content collected from the client device, and other client devices throughout the facility, can provide authorities and officials numerous streams at one time, thereby providing increased visibility to the incident. Moreover, when the client device is joined to the identification session, authorities and officials may be able to engage in communication with any individuals within the vicinity of the client device. For example, officials can speak to an individual trapped in a room due to a natural disaster, providing the individual instructions on safe routes for rescue.

Importantly, the example monitoring systems provided herein can allow multiple officials and first responders to join an incident identification system simultaneously without physical restraints of room capacity. Moreover, officials and first responders who are remote from the incident event can be joined and access live streams from the incident event. This can allow for any number of response teams to be utilized in response to an incident and responders and officials from any location can be joined to aid in the response effort.

Another problem created by current security systems is that only endpoint devices that are officially part of the security system can be used for security purposes. If there is no end point near an incident event, then the security system may be inadequate to address the incident. Advantageously, example incident identification systems provided herein can identify client devices that are near the incident event and even allow for client devices that are not part of the incident identification system to still join an incident identification session. According to one embodiment, if an incident event is determined and an incident identification session is established, the incident identification system may monitor for client devices within a predetermined vicinity of the incident event. For example, the incident identification system may determine that a client device that is not part of the incident identification system, such as a visitor to the facility, is within a predetermined vicinity of the incident event. Based on the vicinity of the client device to the incident event, the incident identification system may transmit a request to the client device to join the identification session. Not only can this provide officials and first responders relevant audio and video streams near the incident event, but it can allow officials and first responders to contact the individual near the incident event. This can allow officials and first responders to provide safety instructions or aid to the individual near the incident event.

A problem that may arise from receiving multimedia streams from numerous client devices within an incident identification system is identification of relevant multimedia streams. For example, if authorities or officials are receiving hundreds of multimedia streams from client devices dispersed throughout a facility, it may be difficult or even impossible to identify a multimedia stream containing relevant information to an incident event.

To assist in identifying a relevant multimedia stream, example incident identification systems provided herein may include dynamic prominence functionality. Dynamic prominence functionality may identify a relevant multimedia stream based on the content of the stream and automatically increase the prominence of the multimedia stream for authorities or officials. For example, the dynamic prominence functionality may identify a relevant multimedia stream based on an audio signature, visual signature, audio activity, visual activity, or identified keywords within the multimedia stream and change the position of the multimedia stream displayed to authorities to indicate its relevance. As will be discussed in greater detail below, an audio signature may include shouting and a visual signature may include fire, flooding, furniture moving, or the like.

The dynamic prominence functionality may collect and analyze the multimedia streams received during an identification session using artificial intelligence, such as one or more machine learning techniques. Example approaches of the dynamic prominence functionality are described in greater detail below.

In some embodiments, the dynamic prominence functionality may use the collected data from the multimedia streams to generate incident data for authorities or officials. For example, based on the collected data from the multimedia streams, the dynamic prominence functionality may generate a heat map of the incident event. In another example, the dynamic prominence functionality may generate a record of relevant multimedia content for authorities or officials to review. It can be appreciated that more than one relevant stream may be identified simultaneously. To provide officials ease of assessing the identified relevant multimedia streams, the dynamic prominence functionality may generate snippets of the identified relevant multimedia streams to allow officials to quickly review the content and determine the content's relevance to response efforts.

In some embodiments, example incident identification systems provided herein may include identification functionality. In certain scenarios, an incident event may include a person of interest. The person of interest may be an unauthorized individual within a facility or may be an individual in need of aid. To assist authorities and officials with identifying and finding a person of interest, the identification functionality may use one or more identifying characteristics to identify the person of interest using the multimedia streams received from the incident identification system. In an example embodiment, a facility may have a check-in kiosk in which all employees and visitors provide identifying information, such as having their picture taken and a voice snippet captured. This identifying information may be stored with a identification database and be used to identify a person of interest within the facility. For example, the identification functionality may monitor the multimedia streams received from the incident identification system for identifying characteristics and compare those identifying characteristics to the identifying information stored within the identification database. If the identification functionality identifies a person having identifying characteristics that do not match the identifying information stored in the identification database, the identification functionality may flag the person as a person of interest. Moreover, the identification functionality may generate an alert that a person of interest has been identified. This can allow authorities or officials to monitor and address the situation as needed.

The incident identification system may also be used to track the person of interest, once identified. For example, if the person of interest is an individual trying to escape a fire within the facility, the identification functionality may be used to track the person of interest as he or she moves to provide officials with the most current location data of the individual to aid in a rescue response. In another example, if the incident event is a perpetrator that has stolen an item, the identification functionality may be used to find persons of interest, such as individuals who are in the vicinity of the perpetrator. Using the incident identification system, the individuals in the vicinity may be alerted of the perpetrator and their location may be used to assist in response efforts. Additionally, the identification functionality may be used to track and follow the perpetrator as he or she moves throughout the facility. In still further embodiments, the identification functionality may be used to determine whether all individuals in a facility have left the building in the event of an incident. For example, the identification functionality may identify all employees as they exit the facility and provide a list of anyone who has not been identified as leaving the building to aid authorities or officials in response efforts.

This illustrative example is given to introduce the reader to the general subject matter discussed herein and the disclosure is not limited to this example. The following sections describe various additional non-limiting examples and examples of systems and methods for providing an incident identification system, providing dynamic prominence during a virtual meeting/session, and providing identification of person(s) of interest.

Referring now to FIG. 1, FIG. 1 shows an example system 100 that provides video conferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
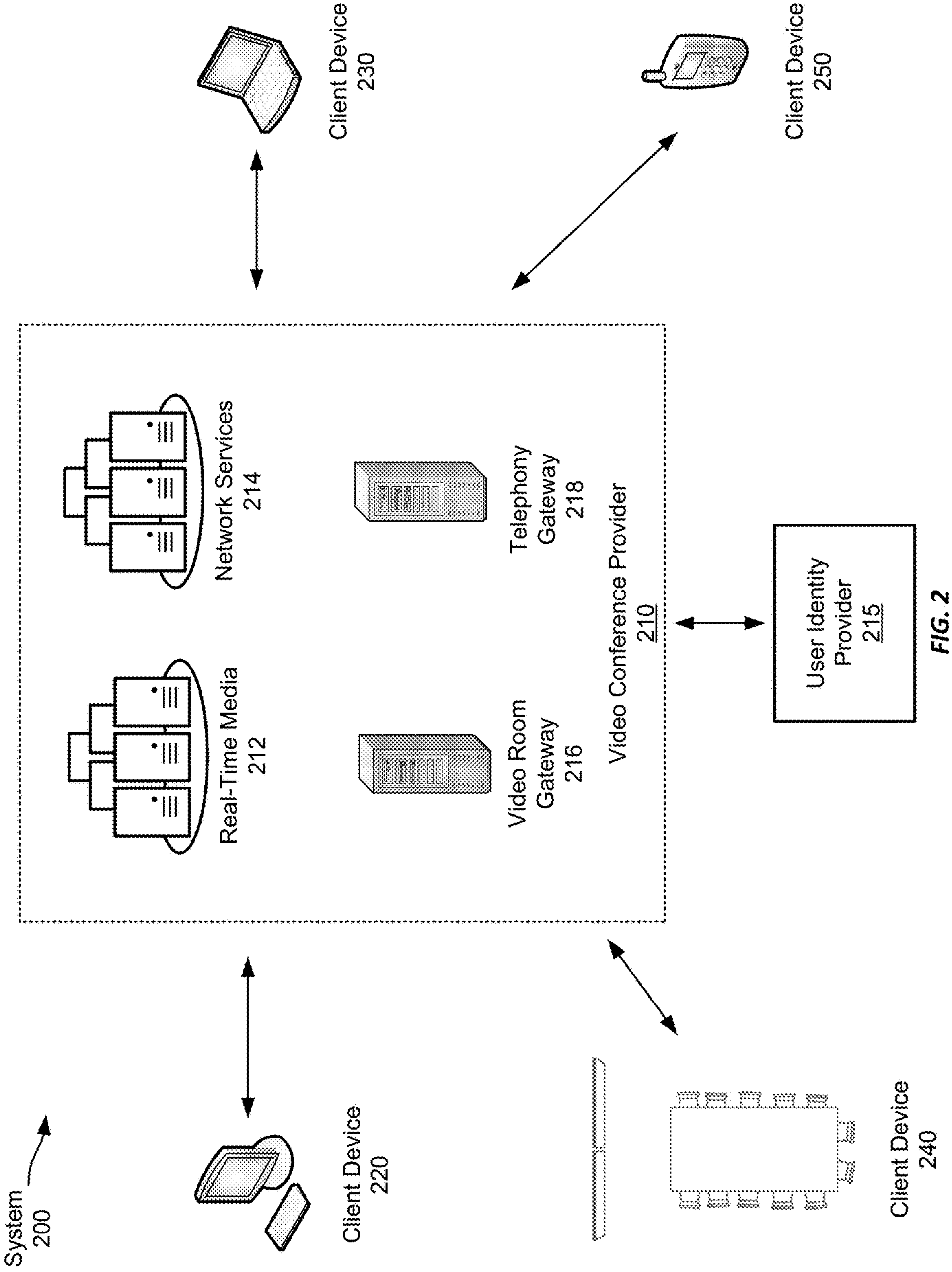

Video conference provider 110 allows clients to create video conference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common video conference may be used.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides video conferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multi-media streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosted by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
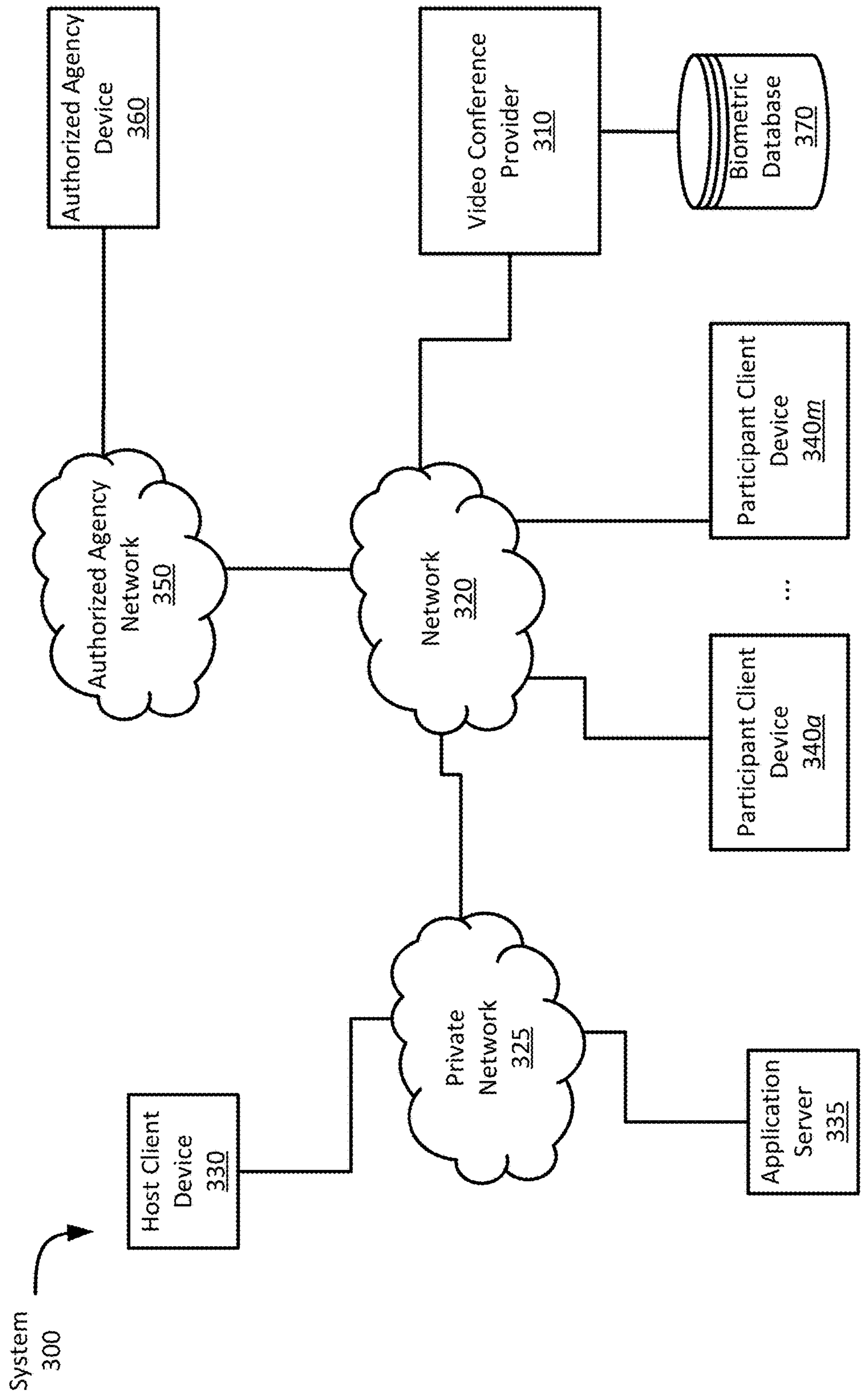

Referring now to FIG. 3, FIG. 3 shows an example system 300 for providing an incident identification system, according to an embodiment herein. The example system 300 may also be used to provide dynamic prominence functionality, according to some embodiments. In still further embodiments, the example system 300 may be used to provide identification of person(s) of interest.

As illustrated, a video conference provider 310 provides video conference services to multiple different client devices 330 and 340*a*-*m*, generally as described above with respect to FIGS. 1 and 2. In this example, the client devices 330 and 340*a*-*m* participate in a meeting hosted by the video conference provider 310. Client devices 340*a*-*m* connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a virtual meeting ("meeting") at the video conference provider 310, such as by beginning a scheduled meeting, generally as described above with respect to FIGS. 1 and 2. The video conference provider 310 may create and manage the meeting as discussed above.

Once the virtual meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the meeting or certain select participants that will be engaged in discussions during the virtual meeting, such as panelists in a panel discussion. Still other limits may be imposed on the various participants, such as their ability to react to occurrences during the meeting, e.g., participants may be allowed to interact with their GUI to raise their hand to ask a question but may not be allowed to provide any other feedback.

During the meeting one of the participant client devices 340*a-m* or the host client device 330 may request to record the meeting. The request to record the meeting may be transmitted to the video conference provider 310. In some embodiments, the video conference provider 310 may prompt the non-requesting client devices with a notification that the meeting is going to be recorded. For example, if the host client device 330 request to record the meeting, the participant client devices 340*a-m* may receive a notification that the meeting is going to be recorded. Once the meeting request is accepted, the video conference provider 310 may record the audio and video streams from all of the client devices, 340*a-m* and 330, until the recording is terminated, or the meeting is ended.

In some embodiments, instead of hosting a virtual meeting, the video conference provider 310 may be requested to initiate an incident identification system. As will be described in greater detail with respect to FIGS. 4-6, an incident identification system may be formed by client devices in communication with the video conference provider 310. For example, the client devices 340*a*-340*m* may be used to form an incident identification system. In some embodiments, the incident identification system may be formed by client devices within a facility or within a specific location, such as a university campus.

To be part of an incident identification system, the client device, such as the client device 340*a*, may receive a request to join the incident identification system. The request may be provided to the client device upon installation or the first use of software associated with video conference provider 310. For example, upon joining a virtual meeting hosted by the video conference provider 310 for the first time, the client device may receive a request to allow the client device to be part of an incident identification system in the event of an emergency incident. If the request is accepted, then the client device may be used to form an incident identification system, or become a part of such a system, in the event of an incident. In some embodiments, the request may be required by administrators of the client device 340*a*. In embodiments where the request to join the incident identification system is denied, the client device 340*a* may not be joined to the incident identification system.

As noted above, an incident identification system may only be activated in the event of an incident. An incident may include any variety of emergency or emergent situations, such as natural disasters, fires, unauthorized persons, unruly visitors, or any other events that pose risk of harm to individuals within the facility. An incident is typically initiated/identified by an individual within the facility (such as the pulling of a fire alarm by a student or pressing an incident button by an admin). However, an incident may also be automatically triggered (such as by a smoke alarm or other sensor used to passively monitor an area for potential emergencies).

Once an incident is identified, a request may be sent to the video conference provider 310 to activate an incident identification system. Upon receiving the request, the video conference provider 310 may transmit a request to the client devices 340*a*-340*m*, and the client device 330 to join an incident identification session.

The identification session may be the same or similar to a virtual meeting hosted by the video conference provider 310. For example, the video conference provider 310 may receive one or more multimedia streams from each of the client devices 340*a*-340*m* and the client device 330 that join the identification session. A key difference, however, between a conventional virtual meeting and an incident identification session is that any client devices 340*a*-340*m* or client device 330 that is available may be automatically joined to the identification session. That is, if a client device, such as the client device 340*a*, is in a powered-on state, and previously accepted to be part of the incident identification system, then the video conference provider 310 may automatically join the client device 340*a* to the identification session without any input from the client device 340*a*. If the client device did not previously accept to be part of the incident identification system, then the video conference provider 310 may transmit a request for the client device to join the incident identification system, and thereafter be joined to the incident identification session, following approval by a user of the client device. The request to join the incident identification system, regardless of the timing (e.g., prior to an incident event or during an incident event) may require input from a user of the receiving client device.

Once a client device, such as the client device 340*a* is joined to the identification session, the video conference provider 310 may gain control of any multimedia stream transmissions to and from the client device 340*a*. Specifically, the video conference provider 310 may gain access to and control over equipment on the client device 340*a* for generating and transmitting an audio stream, a video stream, or a messaging stream to and from the client device 340*a*. As will be described in greater detail below, this can allow for an authorized agency (e.g., officials and first responders) to use the client device 340*a* to gather information regarding an incident within the vicinity of the client device 340*a*. For example, the authorized agency can receive a video stream from the client device 340*a* of the area around the client device 340*a* or the authorized agency can send a message to individuals within the vicinity of the client device 340*a*.

An authorized agency device may also be joined to the identification session to assist in the response to the identified incident event. For example, upon determination of an incident event and initiation of the identification session, the video conference provider 310 may communicate with an authorized agency network 350 to join an authorized agency device to the identification session. Importantly, the authorized agency network 350 may not be contacted until authorization is received from the incident identification system. For example, on-site security, management, or authorized personnel from the facility may be part of the incident identification system and may review an incident event to determine whether the authorized agency network 350 should be contacted. If the on-site security determines that the incident event requires assistance from authorities or first responders, then the authorized agency network 350 may be transmitted a request to join the incident identification session.

In some embodiments, the video conference provider 310 may determine an appropriate authorized agency network 350 to contact. In an example embodiment, the video conference provider 310 may determine an appropriate authorized agency network 350 based on the location of the incident event, the type of incident event, or based on protocols established by the facility in which the incident event is occurring. For example, if the incident event is a hurricane that is endangering the facility, and the individuals therein, the video conference provider 310 may determine that the Federal Emergency Management Agency (FEMA) is an appropriate authorized agency network 350 to contact. In another example, if the incident event is an unauthorized person that has entered the facility, the video conference provider 310 may determine that the local first responder station is the appropriate authorized agency network 350 to contact. In some embodiments, instead of the video conference provider 310 making this determination, a third party may make this determination.

In some embodiments, instead of determining an appropriate authorized agency network 350 to contact, the video conference provider 310 may contact the authorized agency network 350 and the authorized agency network 350 may make the determination of an appropriate authorized agency device 360 to engage. That is, the authorized agency device 360, based on information provided by the video conference provider 310, may make the determination of what other authorized agency device 360 to contact and join to the identification session. The determination may be based on the same information as noted above, such as the location of the incident event, type of incident event, or the procedures of the facility in which the incident event is occurring.

To provide secure access to the client devices 340*a-m* and client device 330, the authorized agency network 350 may be a first responder specific network. For example, the authorized agency network 350 may include or be similar to AT&T's™ FirstNet network. In another example, the authorized agency network 350 may include an internal safety team within the facility or within the video conference provider 310's network. Any connection established during an incident identification session would not be accessible to the public without proper authentication through either the video conference provider 310 or the authorized agency network 350.

Once the authorized agency network 350 is contacted by the video conference provider 310, an authorized agency device 360 may be joined to the identification session. It should be understood that although for the following examples the authorized agency device 360 is described as singular, any number of authorized agency devices 360 may be joined to the identification session. The authorized agency device 360 may be any client device used by an authorized agency to connect to the authorized agency network 350.

Upon joining the authorized agency device 360 to the identification session, the video conference provider 310 may grant the authorized agency device 360 host controls over the identification session. Host controls for an incident identification session may include standard host controls and abilities as well as the ability of the authorized agency device 360 to control equipment of any client device joined to the identification session used to generate a multimedia stream. Example equipment include a client device's microphone, camera, speaker, and, in some cases, messaging applications.

During an incident identification session, the authorized agency device 360 may access and control equipment of a client device, such as the client device 340*a*, to access the area around the client device 340*a*. For example, the authorized agency device 360 may activate a microphone and a camera of the client device 340*a* to receive an audio stream and a video stream from the client device 340*a*. In another example, the authorized agency device 360 may transmit a message to the client device 340*a* to be played via a speaker on the client device 340*a* or may transmit a chat message to the client device 340*a* to be displayed on the client device 340*a*. Once the client device 340*a* joins the identification session, thereby granting the authorized agency device 360 access and control over the equipment of the client device 340*a*, no input may be required from the client device 340*a* to control the equipment of the client device 340*a*.

The host controls granted to the authorized agency device 360 may also allow the authorized agency device 360 to join additional authorized agency devices to the identification session. In other words, if the authorized agency device 360 is granted host controls, the authorized agency device 360 may invite and join a second authorized agency device, such as an authorized agency device from a separate authorized agency. For example, if the authorized agency device 360 is from the local first responder department, the authorized agency device 360 may join a second authorized agency device from a regional or state-level first responder department.

The host controls may also allow the authorized agency device 360 to grant another client device host controls. Following the example above, if the second authorized agency device from a regional or state-level first responder is joined to the identification session, the authorized agency device 360 may grant the second authorized agency device host controls so that the regional or state-level first responder can receive and control audio and video streams from the client devices 340*a*-340*m* of the incident identification system. This can allow multiple authorized agencies to monitor and respond to an incident simultaneously. Depending on the rules defined for various authorized agencies, the host controls may dynamically adjust during the identification session. For example, a regional or state-level first responder authorized agency device may automatically take over host controls from a first responder authorized agency device when the regional or state-level first responder authorized agency device joins the identification session.

In some embodiments, upon initiation of an incident identification session, a dynamic prominence functionality may be used to identify a relevant multimedia stream. The dynamic prominence functionality may be hosted by the video conference provider 310 or by a third-party system.

The dynamic prominence functionality may collect and analyze the multimedia streams received from the client devices 340*a*-340*m* that have joined the incident identification session. The dynamic prominence functionality may analyze the multimedia streams for one or more incident factors. Incident factor(s) may include audio activity, such as a change of audio volume or an increase in talking or screaming, or visual activity, such as an increased amount of movement detected by a camera. For example, if an audio stream contains talking and then there is a sudden switch to whispering, the dynamic prominence functionality may flag the audio stream as having incident factor(s). As will be described in greater detail below with reference to FIGS. 6-8, the dynamic prominence functionality may continue to monitor the audio stream to determine if the content is relevant to an incident event or if the audio activity is innocuous (e.g., irrelevant).

Audio activity may also include an audio signature. Example audio signatures may include distinct sounds that are indicative of an incident event, such as screaming, fire alarms, breaking glass, impact or breaking sounds, crying, moaning, shouting, fire crackling, water/wind noise, and the like. Similarly, visual activity may include a visual signature. Example visual signatures may include distinct visual cues that are indicative of an incident event, such as fire, flooding, furniture moving, people running or waving their hands, flashes of light, sudden darkness, and the like. Additionally, the multimedia streams may be analyzed for keywords that may be relevant to an incident event, such as "help," "run," "fire," etc. Processing of multimedia streams, specifically the audio or text-based content of a multimedia stream, for audio signatures or keywords is discussed in greater detail with respect to FIGS. 12 and 13.

In some embodiments, upon initiation of an incident identification session, a identification functionality may be used to identify a person or persons of interest, such as based upon face recognition, voice or speech recognition, identifying marks (e.g., tattoos, clothing, scars). The identification functionality may be hosted by the video conference provider 310 or may be hosted by a third-party system.

The identification functionality may monitor the multimedia streams during an incident identification session for one or more identifying characteristics. In some embodiments, upon identification of identifying characteristics within a multimedia stream, the identification functionality may compare the identifying characteristics with identifying information stored in a identification database 370. Although the identification database 370 is illustrated as part of the video conference provider 310, it should be appreciated that the identification database 370 may be hosted by another system, such as the private network 325 or by a third-party system. For example, the identification database 370 may be a criminal database hosted by an authorized agency or may be an organization's database that includes identity data of employees or visitors to a facility. In some examples, specific identifying information may be provided based on information obtained about a person of interest, such as the clothing they are wearing.

The identification database 370 may contain identifying information for one or more people. For example, the identification database 370 may contain a profile for every employee of a company, including identifying information for each employee. If a visitor visits the company, then identifying information for that visitor may be added to the identification database 370. In some embodiments, the identifying information may be tagged with an authorized timeframe for which that person is allowed to be present at the facility. For example, a visitor may have a meeting from 8-10 A.M. in the building, during which time the visitor's identifying information may be tagged as authorized. However, if the visitor stays past that time frame or is identified outside of this time frame within the facility, then the visitor may be flagged by the identification functionality as unauthorized. In other embodiments, the identifying information for a visitor may be purged from the identification database 370 when the visit time frame is completed or at the end of each day or week.

In some embodiments, the identification functionality may monitor the multimedia streams during an incident identification session to identify identifying characteristics within the streams. Example identifying characteristics may include facial features, such as hair and eye color, facial hair, or face shape, iris scans, facial images, vocal features, such as an accent, lisp, or voice pitch, physical features, such as height or body type, or movement features, such as a gate or limp. In some embodiments, the identifying characteristics may include characteristics of a person's appearance, such as clothing attire (e.g., color of a jacket, hat, or shoe type) or accessory features (e.g., backpack or purse). Once the identification functionality identifies one or more characteristics in a multimedia stream, the identification may compare the identifying characteristics to identifying information stored in the identification database 370.

In another embodiment, the identification functionality may be provided with one or more characteristics to find within the multimedia streams. For example, the identification functionality may be instructed to identify a person of interest wearing a red hat and having a beard. Based on these identifying characteristics, the identification functionality may monitor and analyze the multimedia streams to identify these identifying characteristics within the streams.

As will be described in greater detail below with respect to FIG. 5, the identification functionality may track a person of interest based on the identifying characteristics. For example, if the person in the red hat and beard is moving throughout a building, the identification functionality may track his movement using multimedia streams from multiple different client devices.

It should be appreciated that in some embodiments, an incident identification session may be established and one or more of the identification functionality or the dynamic prominence functionality may be utilized prior to joining an authorized agency to the incident identification session. For example, the incident identification session may be established, and the identification functionality may identify a person of interest. The person of interest may be flagged for relevant persons in the company who may determine that official involvement is required. Based on the identification of the person of interest, the authorized agency network 350 may be contacted and the authorized agency device 360 may be joined to the incident identification session.

Figure 4:
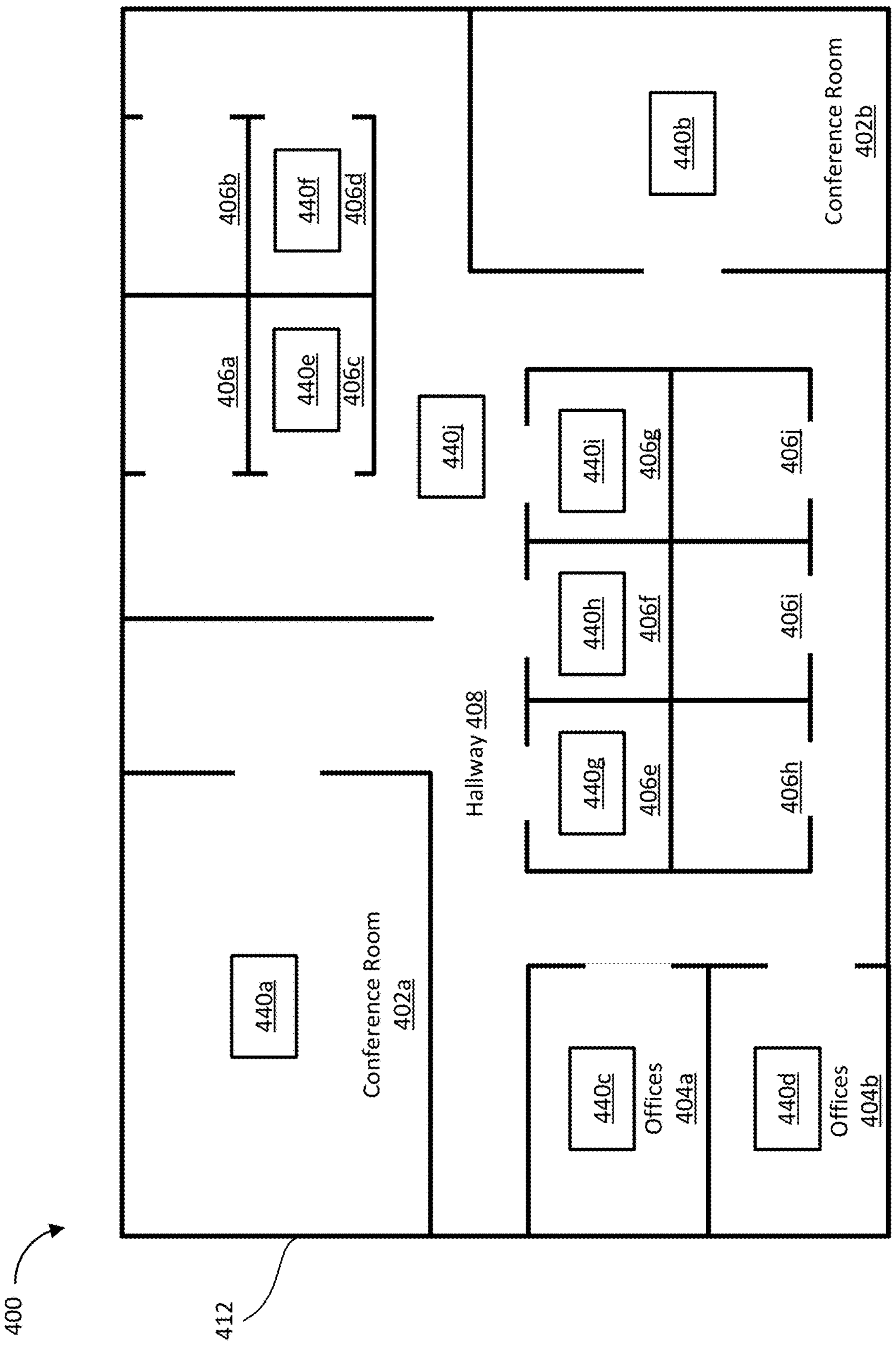
FIG. 4 illustrates an example overview of an incident identification system, according to an embodiment herein.

Referring now to FIG. 4, an illustrative example of an incident identification system 400 is provided, according to an embodiment herein. According to the illustrated example of FIG. 4, the incident identification system 400 may be present within a facility 412. The facility 412 may be a building, such as a school, hospital, or business. As shown, the facility 412 may include numerous rooms, including conference rooms 402*a* and 402*b*, offices 404*a* and 404*b*, and cubicles 406*a*-406*j*. The facility 412 may also have other spaces, such as a hallway 408.

Within the facility 412, there may be client devices, such as computers, cell phones, or video conference systems. For example, client devices 440*a* and 440*b* may be in the conference rooms 404*a* and 404*b*, client devices 440*c* and 440*d* may be in the offices 404*a* and 404*b*, and the client devices 440*e*-440*i* may be in cubicles 406*c*-406*g*, respectively. Additionally, a client device 440*j*, may be in the hallway 408. The client devices 440*a*-440*j* may be the same or similar to the client devices 340*a*-340*m*.

One or more of the client devices 440*a*-440*j* may be part of the incident identification system 400. For example, one or more of the client devices 440*a*-440*j* may have accepted a request to be part of an incident identification system 400 if an incident event was identified within the facility 412. As noted above, during an initial setup of a video conference application or upon joining or entering the facility 412, each of the client devices 440*a*-440*j* may have received a prompt to be part of the incident identification system 400 in case of emergency. If the client devices 440*a*-440*j* accepted the request to part of the incident identification system 400, then the client devices 440*a*-440*j* may be automatically joined to an incident identification session if an incident is determined. In contrast, if the client devices 440*a*-440*j* decline to be part of the incident identification system 440, then the client devices 440*a*-440*j* may not be joined to an incident identification session in the event that an incident is determined. In some embodiments, client devices that are not part of the incident identification system 400 may receive a request to join the identification session in the event that an incident is identified.

Upon identification of an incident event, such as a fire, unauthorized person, tornado, etc., a video conference provider, such as the video conference provider 310, may receive a request to activate, initiate, or establish the incident identification system 400. Upon initiation of the incident identification system 400, an incident identification session may be established. As noted above, an incident identification session may be similar to a virtual meeting in that the video conference provider 310 may connect to one or more of the client devices 440*a*-440*j* to transmit to and receive transmissions from each of the respective client devices within the identification session. A key difference, however, is that each of the client devices 440*a*-440*j* that are part of the incident identification system 400 may be automatically joined to the identification session without any input on the client device side. Moreover, in some embodiments, the multimedia streams to and from the client devices 440*a*-440*j* may be controlled by the video conference provider 310 or an authorized agency device, such as the authorized agency device 360, which may include activating a camera or microphone or adjusting an orientation of one or both of these.

Once an incident identification session is established, an authorized agency device, such as the authorized agency device 360 may be joined to the identification session. As discussed above, the authorized agency device 360 may be automatically joined to the identification session in response to its establishment or may be joined at a later point. One or more of the client devices 440*a*-440*j* may be used to monitor and respond to an incident within the facility 412.

In some embodiments, one or more of the client devices 440*a*-440*j* may be a personal device, such as a smartphone. In such cases, if the client device, such as the client device 440*c*, joins the incident identification session and the participant associated with the client device 440*c* moves throughout the facility 512, the client device 440*c* may provide the incident identification session with video or audio streams as the participant moves. This can allow for mobile monitoring of an incident as the participant moves the client device 440*c* around the facility 512.

Figure 5:
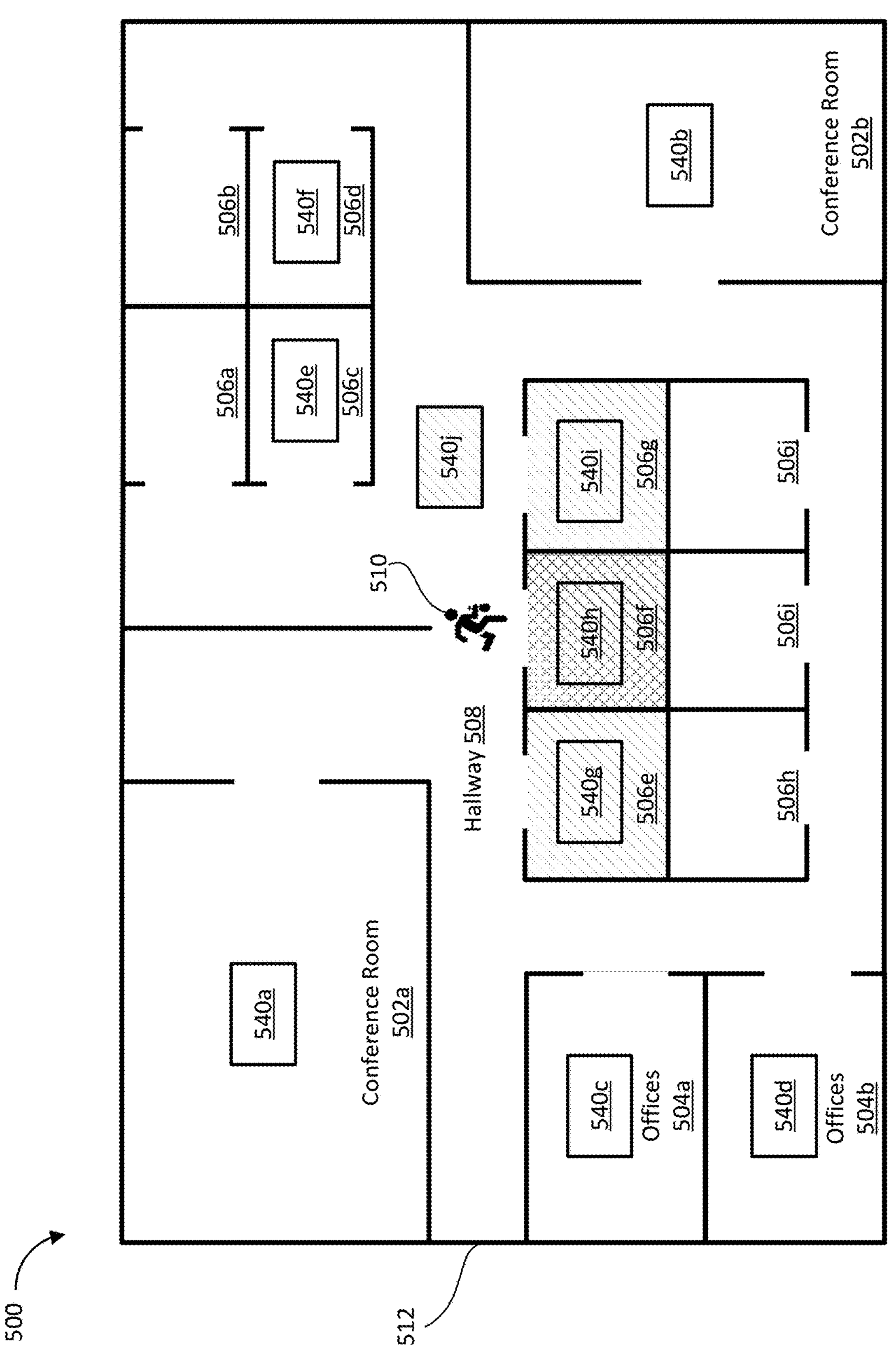
FIG. 5 illustrates an example overview of an incident identification system illustrating an incident, according to an embodiment herein.

Turning now to FIG. 5, an illustrative example of an incident identification system 500 illustrating an incident event is provided, according to an embodiment herein. The incident identification system 500 may be the same or similar to the incident identification system 400, including client devices 540*a*-540*j* being the same or similar to the client devices 540*a*-540*j*. As illustrated, a facility 512 may be the same or similar to the facility 412, including conference rooms 502*a* and 502*b*, offices 504*a* and 504*b*, and cubicles 506*a*-506*j* being the same or similar to the conference rooms 402*a* and 402*b*, the offices 404*a* and 404*b*, and the cubicles 406*a*-406*j*, respectively. The facility 512 may also include a hallway 508 that is similar to the hallway 408.

At some point in time, an incident event 510 may be identified within the facility 512. According to the illustrated example, the incident event 510 may be a person of interest within the facility 512. For example, the person of interest may be an unauthorized person who has entered the facility 512 or a person who is in need of assistance.

In some embodiments, the identification functionality may identify the cause of the incident event 510. For example, the identification functionality may identify a person of interest within the facility 512. As discussed above, a person of interest may be an unauthorized individual, may be a person in need of assistance, or may be persons that the identification functionality is instructed to identify. For example, if a fire alarm for the facility 512 is engaged, then the identification functionality may be used to determine whether everyone has been evacuated from the facility 512.

The identification functionality may monitor the multimedia streams received during an identification session for one or more identifying characteristics. As discussed herein, the identification functionality may access the one or more identifying characteristics for the monitoring from a identification database, such as the identification database 370. In other embodiments, the identification functionality may receive the one or more identifying characteristics to monitor the multimedia streams from relevant authorities, such as on-site security or the authorized agency device.

To monitor for the one or more identifying characteristics ("monitored identifying characteristics"), the identification functionality may analyze a multimedia stream as it is received during an identification session. For example, the identification functionality may identify identifying characteristics present in the multimedia stream and compare them to the one or more monitored identifying characteristics. In some embodiments, the identification functionality may determine a match confidence between the identifying characteristics present in the multimedia stream and the one or more monitored identifying characteristics. For example, if the monitored identifying characteristics include a beard, blue eyes, a red hat, and a black backpack, and the identifying characteristics of the multimedia stream include a beard but none of the other monitored identifying characteristics, the identification functionality may indicate a low confidence match. In contrast, if the identifying characteristics of the multimedia stream include a beard, blue eyes, red hat, and a black backpack, a high confidence match may be indicated. As can be appreciated, the higher number of identifying characteristics found in the multimedia stream that match the monitored identifying characteristics, the higher a confidence match. In some embodiments, an incident alert based on identification of the monitored identifying characteristics may only be generated when a predetermined level of confidence match is found.

To respond to the incident event 510, including providing assistance for a safe rescue of individuals in the facility 512, the incident identification system 500 may be used to join an authorized agency device to the identification session. Due to the nature of the incident event 510, the video conference provider 310 may determine that the local first responder department is the appropriate authorized agency to contact. As such, the video conference provider 310 may connect with an authorized agency network for the local first responder department and an authorized agency device from the local first responder department may be joined to the identification session.

As noted above, the incident event 510 may be identified prior to activation of the incident identification system 500 or the incident identification system 500 may be used to identify the incident event 510. Upon activation of the incident identification system 500, an incident identification session may be established. One or more of the client devices 540*a*-540*j* may be joined to the incident identification session and one or more multimedia streams (e.g., an audio or video stream) from each of the joined client devices 540*a*-540*j* may be transmitted to the video conference provider 310.

The authorized agency device may determine that the client devices 540*e*-540*g* and 540*j* are within the vicinity of the incident event 510, for example, based on the audio and video streams received from the client devices 540*a*-540. As such, the authorized agency device may control equipment on each of the respective client devices 540*e*-540*g*, and 540*j* to gather additional information on the incident event 510. Additionally, the authorized agency device may use the client devices 540*e*-540*g*, and 540*j* to determine if there are any people within the vicinity of the incident event 510, such as within the cubicles 506*a*-506*g* or the hallway 508. Although the provided examples describe the authorized agency device as receiving the multimedia streams from the client devices 540*a*-540*j*, it should be appreciated that in some embodiments the multimedia streams may be received by a respective authority within the company or organization. For example, the facility 512 may have on-site security who may monitor the multimedia streams during an incident identification session. If the on-site security determines that official response or intervention is required, the on-site security may request to join an authorized agency device to the incident identification session.

In some embodiments, a map of the facility 512 may be generated to assist with the response efforts. A map may look similar to the illustrative example of FIG. 5 in that it may include a building layout of the facility 512. Additionally, the map may include identification of client devices that are closest to the incident event 510, as well as a location of the incident event 510. For example, as shown, a map may indicate that the incident event 510 is located in the hallway 508. Additionally, a map may indicate which client devices are closest to the incident event 510. In some embodiments, the map may be a heat map that indicates how close client devices are to the incident event 510. As shown, the cubicle 506*f* or the client device 540*h* may be shaded or otherwise indicate that the cubicle 506*f* or the client device 540*h* is closest to the incident event 510. A different color or shading method may be used to indicate that cubicles 506*e* and 506*g*, or the client devices 540*g* and 540*j*, are also within the vicinity of the incident event 510 but are slightly further away than the cubicle 506*f* and the client device 540*h*. Similarly, the client device 540*j* may be shaded to indicate that it too is within the vicinity of the incident event 510. Any format of identification may be used to illustrate a client device's vicinity to the incident event 510, including a distance from a client device to an incident. It should be appreciated that while only one incident event 510 is illustrated in FIG. 5, there may be any number of incidents 510 occurring simultaneously or sequentially within the facility 512.

In some embodiments, a movement map may be generated to show movement of the incident event 510. For example, the movement map may illustrate the movement of an unauthorized person throughout the facility 512 or may illustrate the spread of a fire throughout the facility 512.

Figure 6:
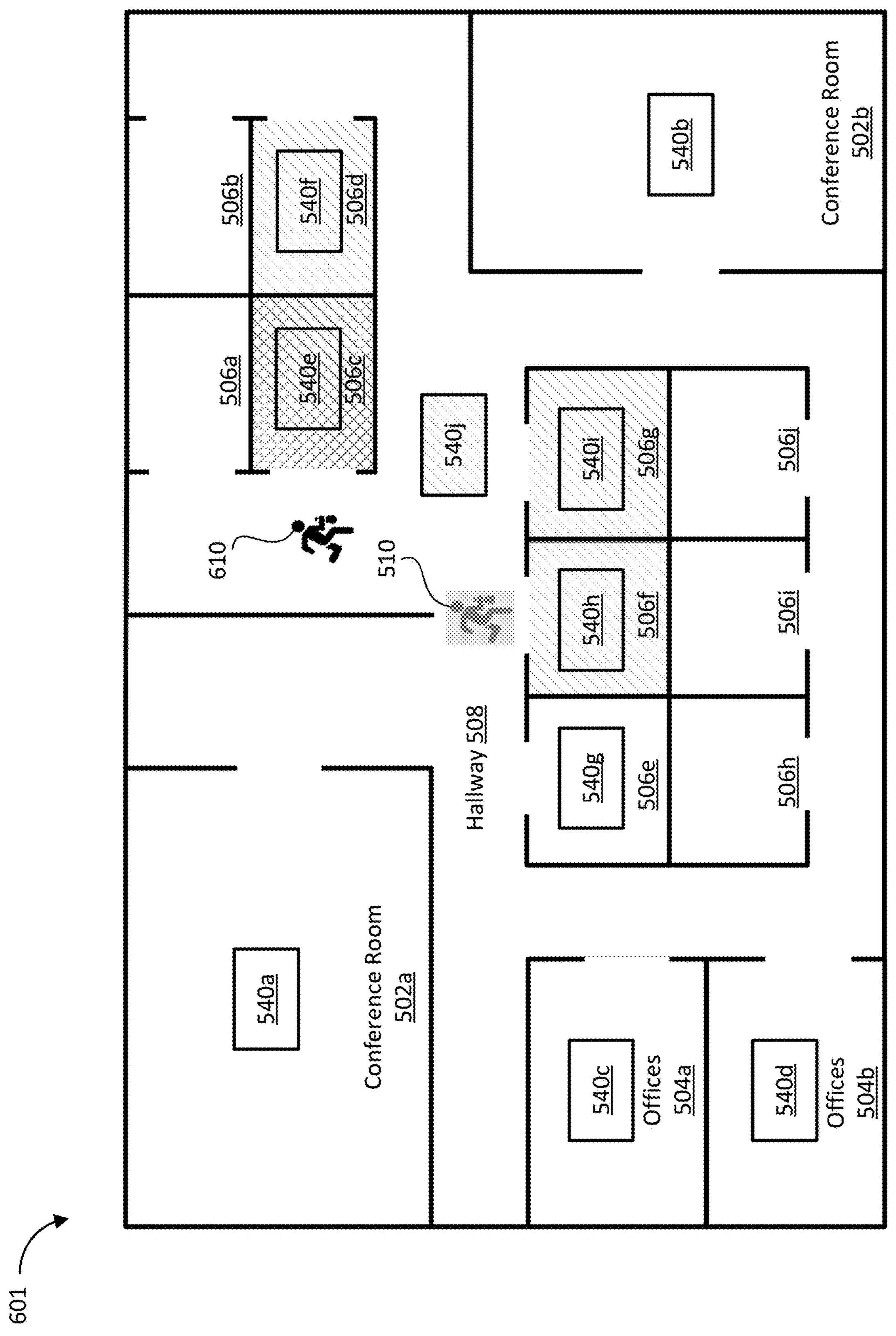
FIG. 6 illustrates an example movement map of an incident, according to an embodiment herein.

Referring now to FIG. 6, an example movement map 601 of the incident event 510 is provided, according to an embodiment herein. The illustrated movement map 601 may illustrate that an unauthorized person moved from the incident event 510 location (e.g., last known location) to an incident event 610 location. The movement map may also illustrate that the cubicle 506*c* or the client device 540*e* is now closest to the incident event 610, thereby allowing responders to update response efforts. The movement map 601 may also indicate that the cubicles 506*d*, 506*f*, and 506*g*, or the client devices 540*f*, 540*h*, and 540*i*, are now within the vicinity of the incident event 610, as is the client device 540*j*. Again, this may allow the authorized agency device to know which client devices to engage to gather information regarding the incident event 610, as well as determine if anyone is trapped within the vicinity of the client devices 540*e*-540*f* and 540*h*-540*i*.

In some embodiments, the movement map 601 may be interactive. That is, a participant viewing the movement map 601 may be able to select a client device, such as any of the client devices 540*a*-540*j*, and be provided with a corresponding audio and video stream for the selected client device. For example, if a participant selects the client device 540*i* from the movement map 601, the participant may be able to view a video stream and hear an audio stream from the client device 540*i*. In some examples, all of the active client devices' multimedia streams may be captured and displayed within their respective portions of the movement map 601 so the entirety of the area may be monitored and, if appropriate, have their prominence increased based on detected activity or on user selection.

Figure 7:
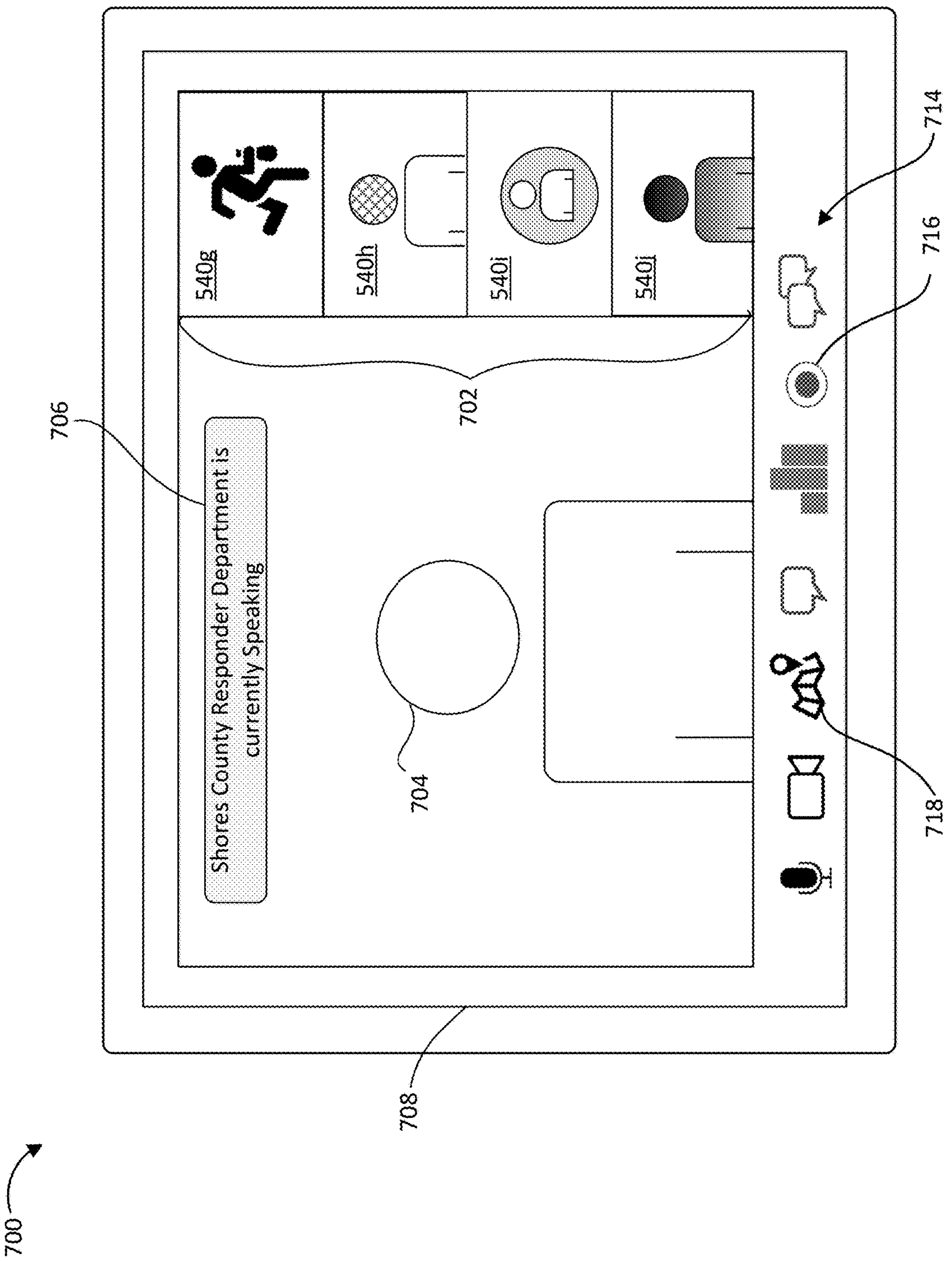
FIG. 7 illustrates a graphical user interface (GUI) for providing an incident identification session using an incident identification system, according to an embodiment herein.

Referring now to FIG. 7, an example graphical user interface (GUI) 700 for providing an incident identification session using an incident identification system is provided, according to an embodiment herein. For example, the GUI 700 may be provided to any client device that is joined to the identification session. In some embodiments, the GUI 700 may only be provided to client devices associated with the response side of the identification session, such as authorized agency devices or authorized devices within a company or organization (e.g., on-site security). In an example embodiment, the GUI 700 may be provided to a second authorized agency device who has joined the identification session as part of the response effort. The client devices, such as the client devices 540*a*-540*j*, may receive a different GUI, such as the GUI 1000 described in greater detail below with respect to FIG. 10, because it may not be useful for the client devices 540*a*-540*j* to receive the multimedia streams from the other client devices 540*a*-540*j* within the incident identification system 500.

As shown, the GUI 700 may include a display 708. The display 708 may include a roster 702 of video streams received from client devices within an incident identification system. For example, the roster 702 may include video streams from the client devices 540*g*-540*j* as part of the incident identification system 500. As illustrated, the video streams from the client devices 540*g*-540*j* may provide important information regarding the incident event 510, including showing the incident event 510 in the video stream from the client device 540*g* and showing individuals who are trapped in the vicinity of the incident event 510 near the client devices 540*h*-540*j*.

In some embodiments, the roster may include a video stream of some or all of the participants of the identification session, including video streams from other authorized agency devices who have joined the identification session. In other embodiments, the roster 702 may include a picture, image, representation, avatar or a listing of some or all of the participants who have joined the identification session. When a participant joins the identification session, the joining participant is added to the roster 702. In some embodiments, there may be a roster for the client devices 540*a*-540*j* that are part of the incident identification system 500 and a separate roster for client devices that are joining on the response side, such as any authorized agency devices that have joined the identification session.

Once the identification session is initiated, video and audio streams may be exchanged between the participants, including the client devices 540*a*-540*j* within the incident identification system 500. The display 708 may include the video stream of a currently speaking participant 704, which may be an authorized agent such as a first responder department official. The audio stream from participant 704 may also be transmitted along with the display 708. In some embodiments, more than one participant may be speaking, and in such cases, display 708 may include two or more windows providing the video streams from the speaking participants.

To indicate to participants of the identification session which responder is speaking, an indication 706 may be provided. The indication 706 may identify an authorized agency that the participant 704 is associated with. The indication 706 can provide important context about the participant 704, such as jurisdictional information to viewing participants. In some embodiments, instead of a banner, like the indication 706, the background of the display 708 may change colors, highlight, pulse, or toggle in size to indicate the context about the participant 704.

The display 708 may include a dashboard 714 containing one or more action selections. For example, the dashboard 714 may include a recording selection 716 that allows a participant to record the streams of audio and video during the identification session. In some embodiments, an incident identification session may automatically be recorded, while in other embodiments, the ability of a participant to invoke the recording selection 716 may be at the description of the meeting host or authorized agency device 360. This may be important for record keeping purposes or trainings subsequent to this incident. In some embodiments, the dashboard 714 may include other selections such as a chat selection, a polling selection, and the like. Depending on the settings of individual client devices, recording may automatically be disabled for multimedia streams from that specific client device. Furthermore, access to the recording may be strictly limited to prevent unauthorized access of the recorded multimedia streams.

In some embodiments, the dashboard 714 may include a map selection 718. The map selection may allow a participant to view a movement map of an incident event. For example, upon selection of the map selection 718, a display of the movement map 601 may be provided on the GUI 700. As noted above, the movement map 601 may be interactive in that a participant can select client devices or regions on the movement map 601 and be provided with a corresponding multimedia stream.

As discussed above, in some embodiments, the dynamic prominence functionality may monitor and analyze the multimedia streams from the client devices joined to the incident identification session, such as the client devices 540*a*-540*j*. The dynamic prominence functionality may monitor and analyze the multimedia streams for content relevant to the incident event. Upon identification of a relevant multimedia stream (e.g., a multimedia stream containing the incident factor(s)), the dynamic prominence functionality may increase a prominence of the relevant multimedia stream. By increasing the prominence of the relevant multimedia stream, the dynamic prominence functionality can alert authorities or officials of the incident factor(s).

Figure 8:
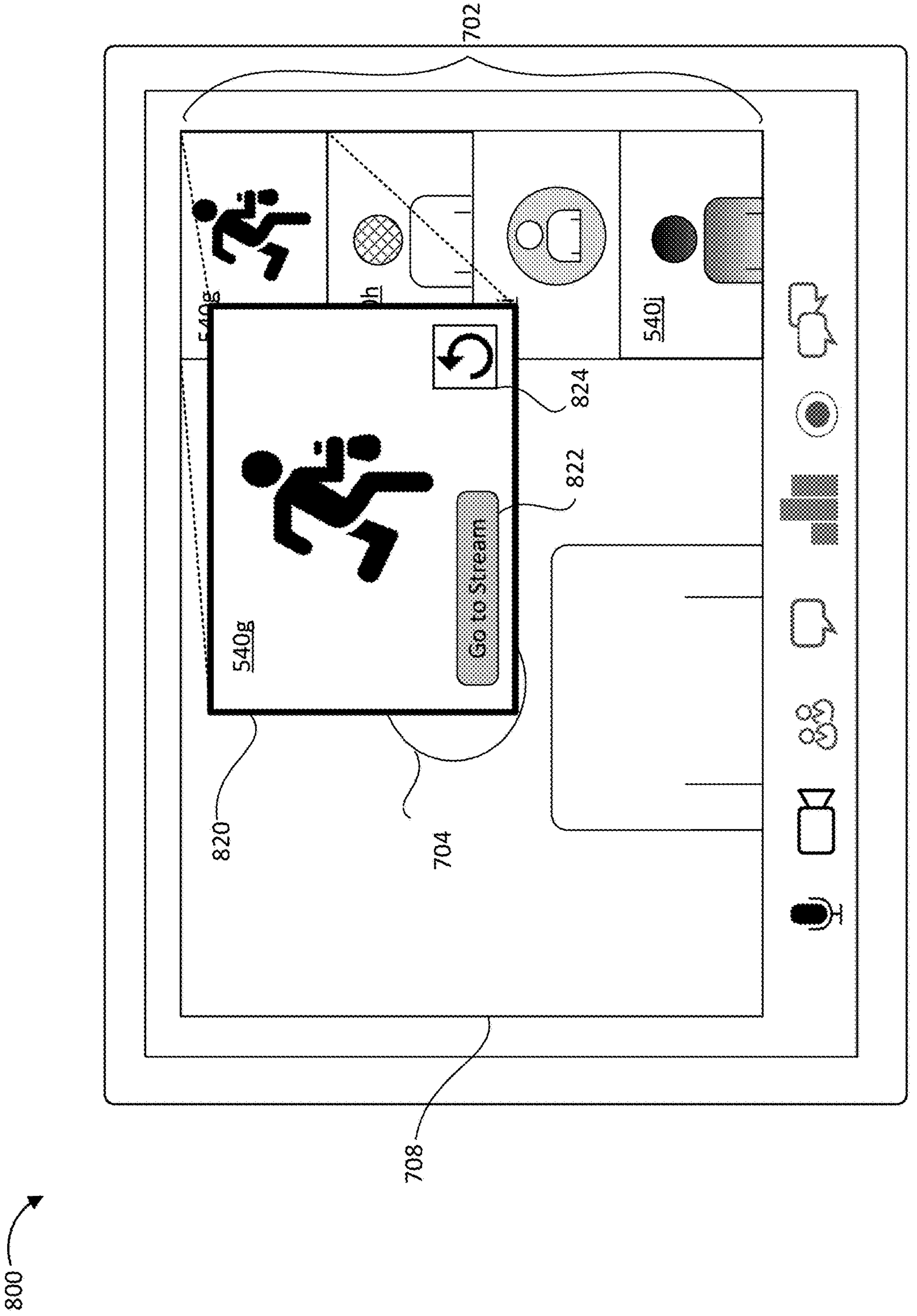
FIG. 8 illustrates a GUI having increased prominence of a multimedia stream, according to an embodiment herein.

Referring now to FIG. 8, an example GUI 800 having increased prominence of a multimedia stream is illustrated, according to an embodiment herein. The GUI 800 may be the same as the GUI 700.

At some point during the incident identification session, the dynamic prominence functionality may identify a relevant multimedia stream. For example, the dynamic prominence functionality may identify a relevant multimedia stream based on a visual signature indicating a person running. The dynamic prominence functionality may, in some embodiments, analyze the context of the visual signature to determine the relevance of the identified visual signature. For example, a person running down a hallway may merely be a person late for a meeting, and thus irrelevant to an incident event, while in other embodiments, a person running down a hallway may indicate an emergency, thus relevant to an incident event. The context of the person running down the hallway (e.g., the identified visual signature), such as multimedia streams from client devices nearby, may assist in determining the relevance of the identified visual signature.

In some embodiments, the dynamic prominence functionality may rank the relevancy of the content of the multimedia stream as part of determining it as a relevant multimedia stream. For example, the dynamic prominence functionality may analyze the multimedia stream in context, such as for example analyzing both the video stream and the audio stream. If the video stream contains an incident factor such as an individual running down a hallway and the corresponding audio stream also contains an incident factor such as screaming, then the multimedia stream may be ranked as having high relevancy. For example, given a 3 ranking out of 3. In contrast, if the video stream contains an incident factor, such as the individual running down the hallway, but the corresponding audio stream does not contain an incident factor, then the multimedia stream may be ranked as having a 2. Finally, if the multimedia stream does not contain any incident factors (e.g., neither the video nor audio streams contain an incident factor), then the multimedia stream may be ranked as having a 1 for low relevancy.

In another embodiment, the identification functionality may identify a person of interest and the dynamic prominence functionality may determine the relevant multimedia stream based on identification of the person of interest.

As shown, the relevant multimedia stream may be received from the client device 540*g*. To increase the prominence of the relevant multimedia stream, the dynamic prominence functionality may visually alter a display 820 of the relevant multimedia stream. For example, the display 820 of the relevant multimedia stream may increase in size, may change position, may become the focus of the display 708, may pulse or change colors, or otherwise visually change to alert a viewing participant. In some embodiments, instead of visually altering the display 820, a corresponding audio stream may be altered to alert a viewing participant of the incident factor(s). For example, a corresponding audio stream for the display 820 may increase in volume. In some embodiments, the relevant multimedia stream may be both visually and audibly altered to capture the attention of a viewing participant.

In some embodiments, the display 820 of the relevant multimedia stream may include a selection option 822. The selection option 822 may allow a participant to go to the relevant multimedia stream that is flagged by the increase prominence. For example, if the display 820 of the relevant multimedia stream pulses or changes color to indicate the incident factor(s), a viewing participant may be able to select the selection option 822 and the display 708 may be replaced with the display 820 of the relevant multimedia stream.

The display 820 may also include a replay selection option 824. As can be appreciated, between the time that the incident factor(s) is identified in the multimedia stream and the viewing participant is alerted, the content of the multimedia stream may have changed. To allow the viewing participant the ability to review the identified incident factor(s), the display may provide the replay selection option 824. Upon selection of the replay selection option 824, the display 820 may play a snippet of the incident factor(s) identified by the dynamic prominence functionality. The replay selection option 824 may allow a viewer to freeze the snippet or freeze the pane in the snippet. This can allow a viewer to fully analyze a snippet of relevant content.

It can be appreciated that in some embodiments, more than one relevant stream may be identified simultaneously. To provide officials ease of assessing the identified relevant multimedia streams, the dynamic prominence functionality may generate snippets of the identified relevant multimedia streams to allow officials to quickly review the content and determine the content's relevance to response efforts. In another embodiment, a heat map may also be used to filter out irrelevant multimedia streams or identify relevant multimedia streams.

Figure 9:
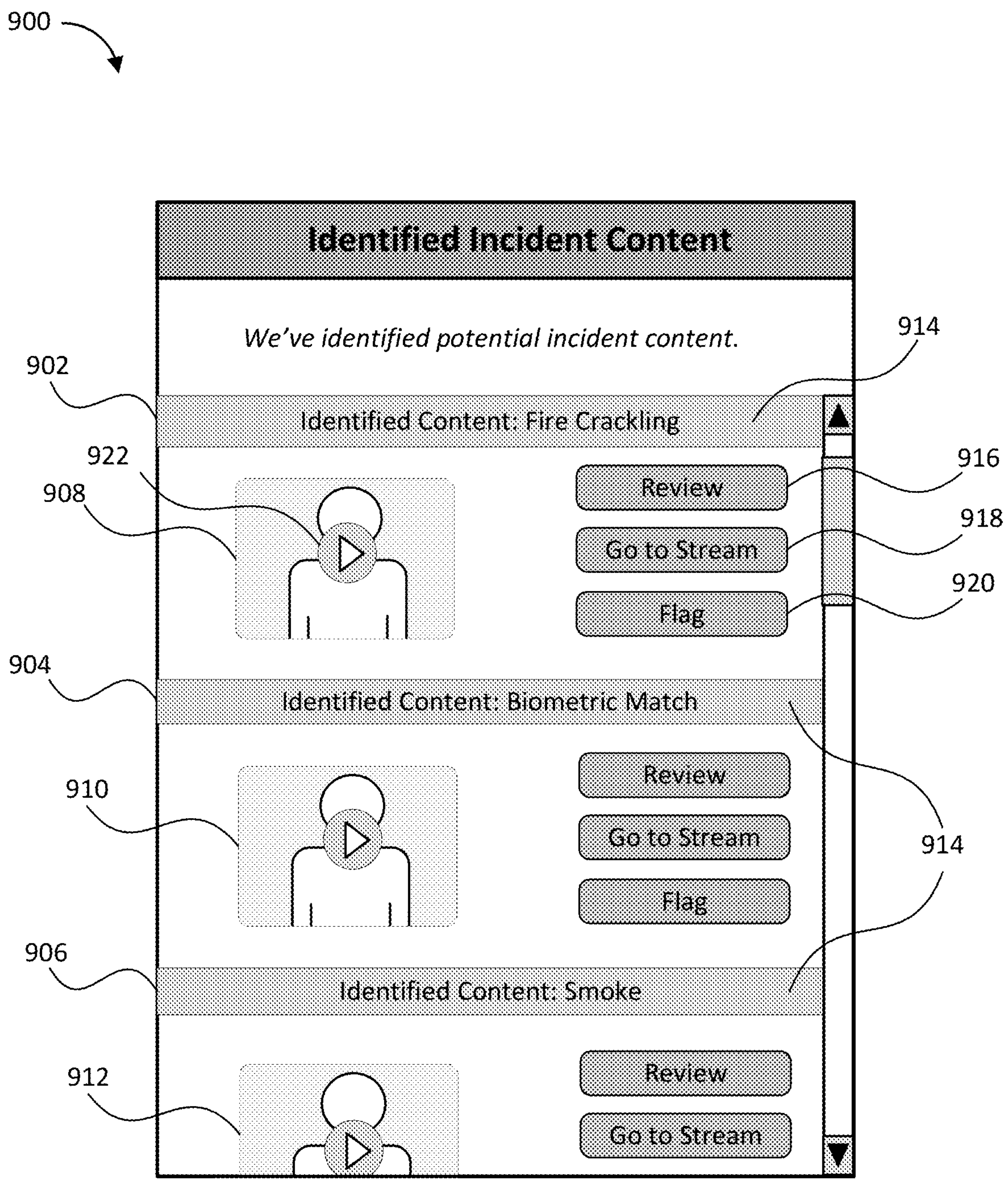
FIG. 9 illustrates an example content replay prompt, according to an embodiment herein.

Referring now to FIG. 9, an example content replay prompt 900 is provided, according to an embodiment herein. The content replay prompt 900 may provide snippets of incident factor(s) identified by the dynamic prominence functionality from various multimedia streams. For example, as illustrated, the prompt 900 may include a first snippet 908 of identified content 902, a second snippet 910 of identified content 904, and a third snippet 912 of identified content 906. Each of the identified content 902, 904, and 906 may include a label 914 that provides a brief description of what the dynamic prominence functionality identified in each of the snippets 908-912. For example, the label 914 for the identified content 902 indicates that the identified content is fire crackling, the label 914 for the identified content 904 indicates that the identified content is an identity match, and the label 914 for the identified content 904 indicates that the identified content is smoke. In still further embodiments, a ranking level of the intensity of the incident factors identified by the dynamic prominence functionality may be determined. For example, each of identified content 902, 904, and 906 may include another label (not shown) indicating an intensity level of the identified content. If the identified content is prominent or of high intensity or duration (e.g., screaming the entire clip vs. a single scream), then a high intensity level may be determined.

Each of the snippets 908-912 may include a play selection 922 that may play a snippet of the identified content. A snippet may be a short or small video/audio clip of the identified content. For example, a 5-second video, including audio, of the identified content 902 for snippet 908 may be played upon selection of play selection 922. If the viewing participant would like to review the entire clip of the identified content, the participant can select the review selection 916. Upon selection of the review selection 916, the entire clip of the identified content may be played. Following the above example, if the review selection 916 for the snippet 908 is selected, then the full 2-minute video, along with audio, of the identified content 902 may be played.

A 'Go-to-Stream' selection 918 may also be provided for each of the snippets 908-912. If the viewing participant wants to view the live feed of the multimedia stream corresponding to the snippet 908, then the participant can press the selection 918. Upon pressing of the selection 918, the participant may be provided with the live feed of the multimedia stream corresponding to the snippet 908.

Additionally, a flag selection 920 may be provided for each of the snippets 908-912. Upon pressing of the flag selection 920, the snippet 908 may be tagged or flagged as containing incident factor(s). This can allow various members of a response team to work in concert when preparing a response effort. For example, one member of the response team may review the identified content snippets 908-912 and flag the snippets containing the most incident factor(s) for other members of the response team. The flag selection 920 can also be useful for record keeping or review of an incident event after the fact.

As noted above, the client devices 540*a*-540*j* that are part of the incident identification system 500 may receive a different GUI, according to some embodiments. That is, the GUIs 700 and 800 may not be provided to the client devices 540*a*-540*j*. It could be appreciated that it may be useful to only provide the client devices 540*a*-540*j* within the facility 512 with filtered and specific information, and in some cases, with no information at all. This may reduce the stress and alarm of the individuals within the facility 512. Instead of being provided with the GUIs 700 and 800, the client devices 540*a*-540*j* may be provided with an incident specific GUI.

Figure 10:
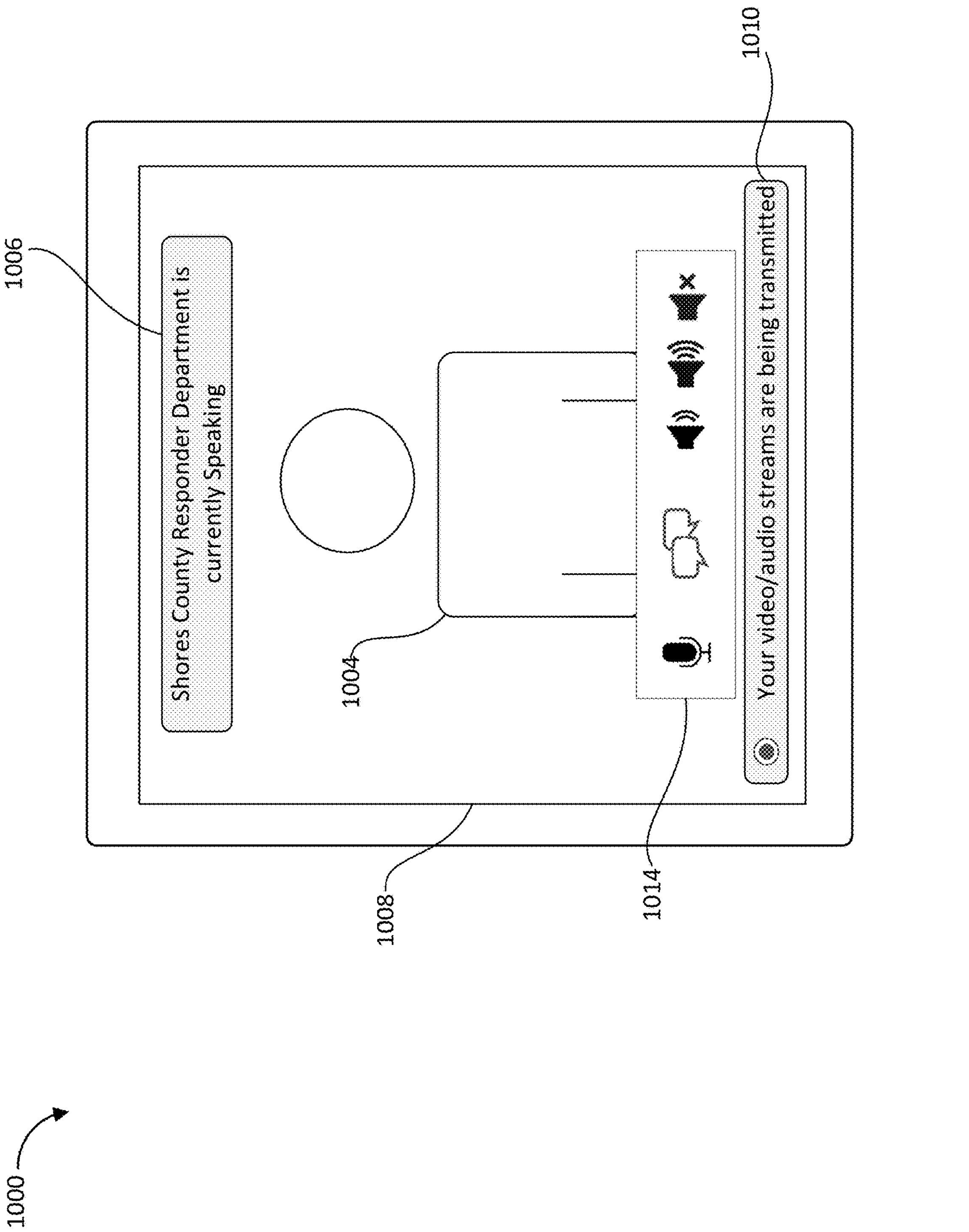
FIG. 10 illustrates a GUI provided to a client device that is part of an incident identification system, according to an embodiment herein.

Referring now to FIG. 10, a GUI 1000 provided to a client device that is part of an incident identification system is illustrated, according to an embodiment herein. For example, the GUI 1000 may be provided to the client device 540*h*. In some embodiments, all of the client devices 540*a*-540*j* may receive the GUI 1000 because they are part of the incident identification system 500, while in other embodiments, the GUI 1000 may only be provided to specific client devices that are near the incident event 510, such as the client device 540*h*.

As shown, the GUI 1000 may include a display 1008. The display 1008 may be similar to the displays 708 or 808 in that it may provide a video stream of a speaking participant 1004. As illustrated, the participant 1004 may be a local first responder using the authorized agency device. Along with a video stream from the authorized agency device, an audio stream may also be provided. In some embodiments, instead of an audio stream, a transcription of the speaking participant 1004's audio stream may be provided. It can be appreciated that there may be scenarios in which playing audio from the client device 540*h* during an incident may be undesirable as it could pose a danger to individuals near the client device 540*h*.

The display 1008 may also provide an indication 1006. The indication 1006 may be the same or similar to the indication 706 in that it may provide context to the viewing participant as to a jurisdiction or status of the speaking participant 1004. For example, as shown, the indication 1006 may indicate that the speaking participant 1004 is from a Shores County Responder Department.

The display 1008 may also include a dashboard 1014. The dashboard 1014 may be different from the dashboards 714 and 1014 in that only limited selections are provided. For example, the dashboard 1014 may only include selections to allow the client device 540_h_ to speak to the speaking participant 1004 (e.g., the microphone icon), message the speaking participant 1004 (e.g., the chat message icon), or adjust volume controls.

In some embodiments, the display 1008 may also include a notification 1010. The notification 1010 may indicate that the audio or videos streams from the client device 540_h_ are being transmitted to the authorized agency device. For example, the authorized agency device may, upon determining that the client device 540_h_ is near the incident event 510, activate the equipment of the client device 540 to receive a video and audio stream from the client device 540_h_. Upon receiving the video and audio stream from the client device 540_h_, the display 1008 may provide the notification 1010 to indicate the transmission of the audio and video streams. This may provide important information to individuals within the vicinity of the client device 540_h_, such as letting them know that officials can see and hear them.

As noted above, when an incident factor is identified, an alert may be generated and transmitted by the video conference provider. For example, an incident alert may be transmitted to an authorized agency or to relevant authorities associated with the incident identification system. In some embodiments, an additional alert may be transmitted to client devices within the vicinity of the incident event.

Figure 11:
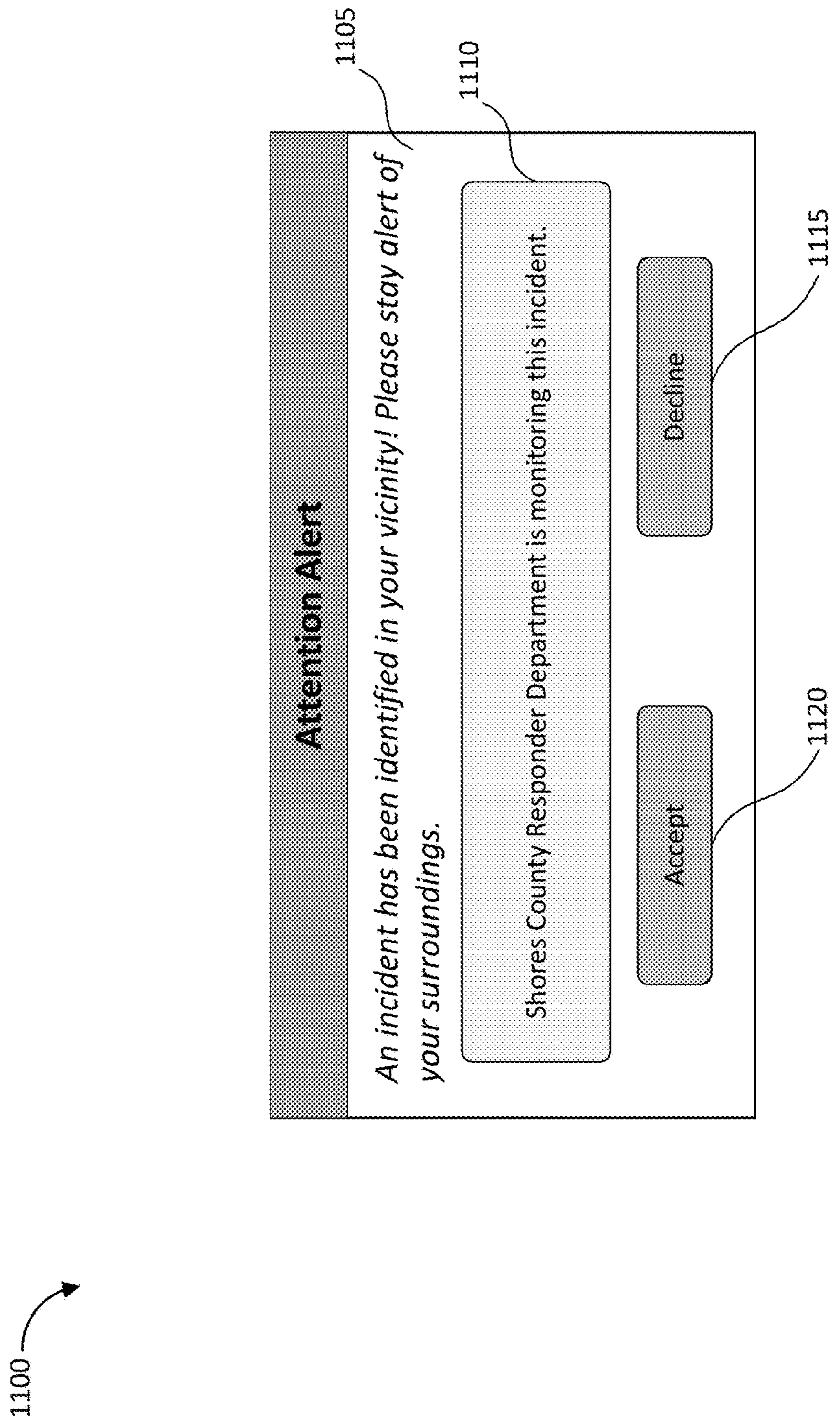
FIG. 11 illustrates an incident alert received by a client device as part of an incident identification system, according to an embodiment herein.

Referring now to FIG. 11, an attention alert 1100 received by a client device within the vicinity to an incident identification system is provided, according to an embodiment herein. With reference to FIG. 5, if an individual associated with the client device 540_j_ is a visitor to the facility, the client device 540_j_ may not be part of the incident identification system 500. However, since the client device 540_j_ is within the vicinity of the incident event 510, the client device 540_j_ may receive an emergency alert, such as the attention alert 1100. Client devices that are part of the incident identification system 500 that are within the vicinity of the incident event 510 may also receive the attention alert 1100.

Prior to the client device 540_j_ receiving the attention alert 1100, a determination may be made that the client device 540_j_ is within the vicinity of the incident event 510. For example, if the client device 540_j_ joined the facilities network, then an IP address of the client device 540_j_ or other network information, such as a local area network port or WiFi access point connected to the client device, may be used to determine its location. In other embodiments, global positioning data (GPS) data or cellular network data from the client device 540_j_ may be used to determine its location. Based on this information, it may be determined that the client device 540_j_ is within a predetermined vicinity of the incident event 510 and therefore may be useful to response efforts. In some embodiments, the client device 540_j_'s nomadic e911 information may be used by the authorized agency, such as the authorized agency network 350, to determine the location of the client device 540_j_.

Once the client device 540_j_ is identified as being within the vicinity of the incident event 510, the video conference provider 310 may transmit the attention alert 1100 to the client device 540_j_. As shown, the attention alert 1100 may include a notice 1105 that there is an emergency within the vicinity. Additionally, the attention alert 1100 may include a request 1110 for the client device 540_j_ to join the identification session. In some embodiments the request 1110 may include a description of the identification session, specifically indicating that an authorized agency device is monitoring the incident. The request 1110 may also include a notification that by joining the identification session the client device 540_j_ grants control of equipment configured to generate one or more multimedia streams from the client device 540_j_ to the video conference provider 310 or the authorized agency device 360. For example, as illustrated, the request 1110 may include language indicating that an official or authorized agent requests access and control of the client device 540_j_'s microphone and camera.

If the individual associated with the client device 540_j_ does not want to join the identification session, a button 1115 may be selected. Upon selection of the button 1115, the video conference provider 310 or the authorized agency device 360 may receive an indication that the client device 540_j_ has declined to join the identification session. In contrast, if the individual associated with the client device 540_j_ would like to join the identification session, a button 1120 may be selected. Upon selection of the button 1120, the client device 540_j_ may be joined to the identification session and the authorized agency device 360 may gain access and control of the client device 540_j_ 's equipment used to generate audio and video streams (e.g., microphone and camera).

In some embodiments, the multimedia streams from the client devices that are part of an incident identification session, such as the client devices 540_a_-540_j_, may be monitored and analyzed for incident factor(s) to the incident event. For example, the audio streams from the client devices 540_a_-540_j_ may be monitored for the keywords "fire" or "help," or analyzed for one or more audio signatures, such as screaming. This may assist the incident identification system in identifying an incident event, identifying client devices that are near an incident, or individuals in need of assistance due to the incident. Additionally, in some embodiments, instead of transmitting an audio stream of a speaking participant, such as the speaking participant 1004, to the client devices 540_a_-540_j_, a transcription of the audio stream from the speaking participant 1004 may be provided. In still further embodiments, a transcription from audio streams transmitted during an incident identification session, and any related breakout rooms, may be generated for record or training purposes.

Figure 12:
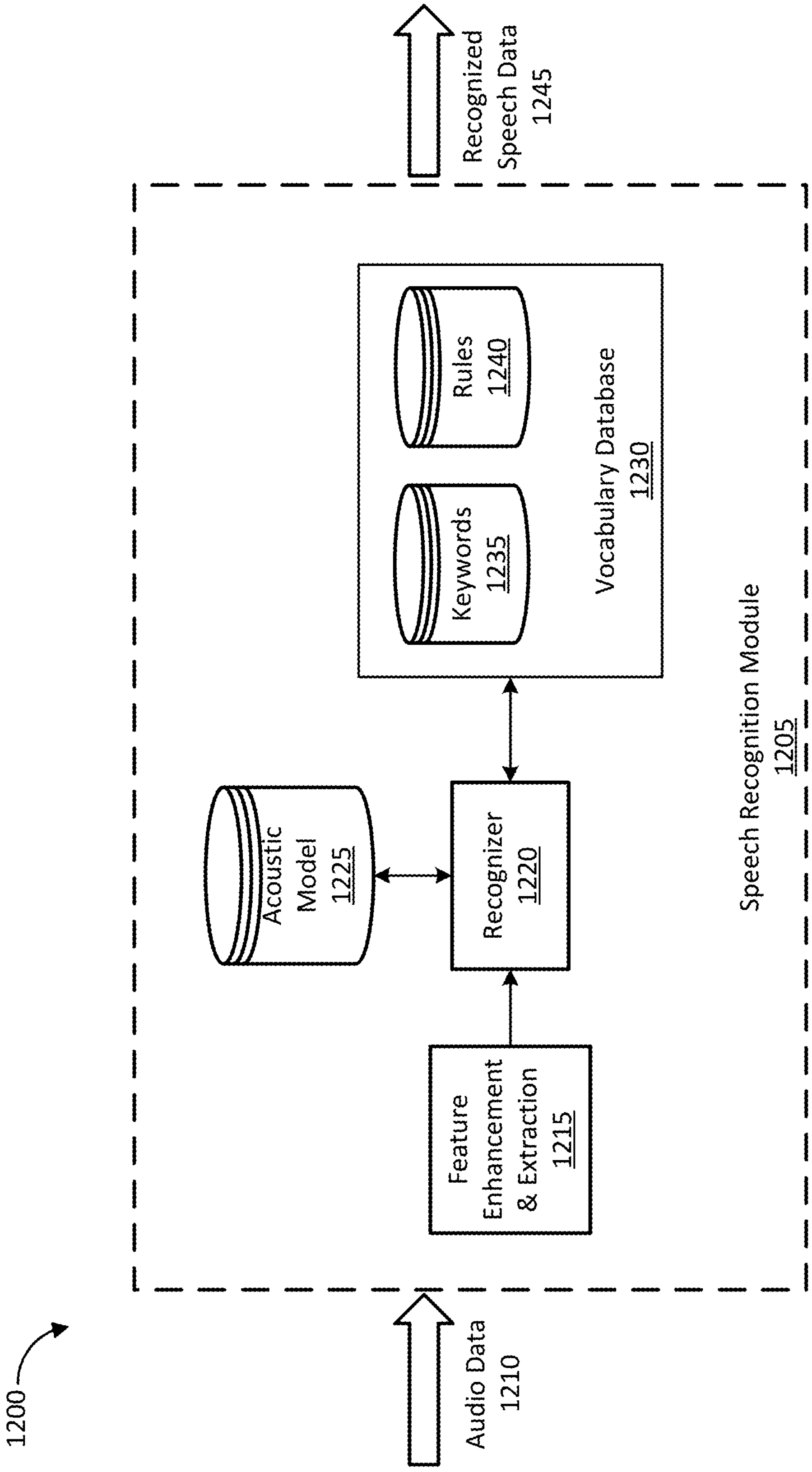
FIG. 12 illustrates an example speech recognition system that may be locally or remotely executed, according to an embodiment herein.

Turning now to FIG. 12, an example speech recognition system 1200 that may be used for the dynamic response functionality, or the identification functionality is provided. The speech recognition system 1200 may be executed locally or remotely. For example, the speech recognition system 1200 may be locally executed on a client device, however, in other embodiments, the speech recognition system 1200 may be cloud-based and/or remotely executed by a video conference provider, such as the video conference provider 310, or a third-party system.

Figure 13:
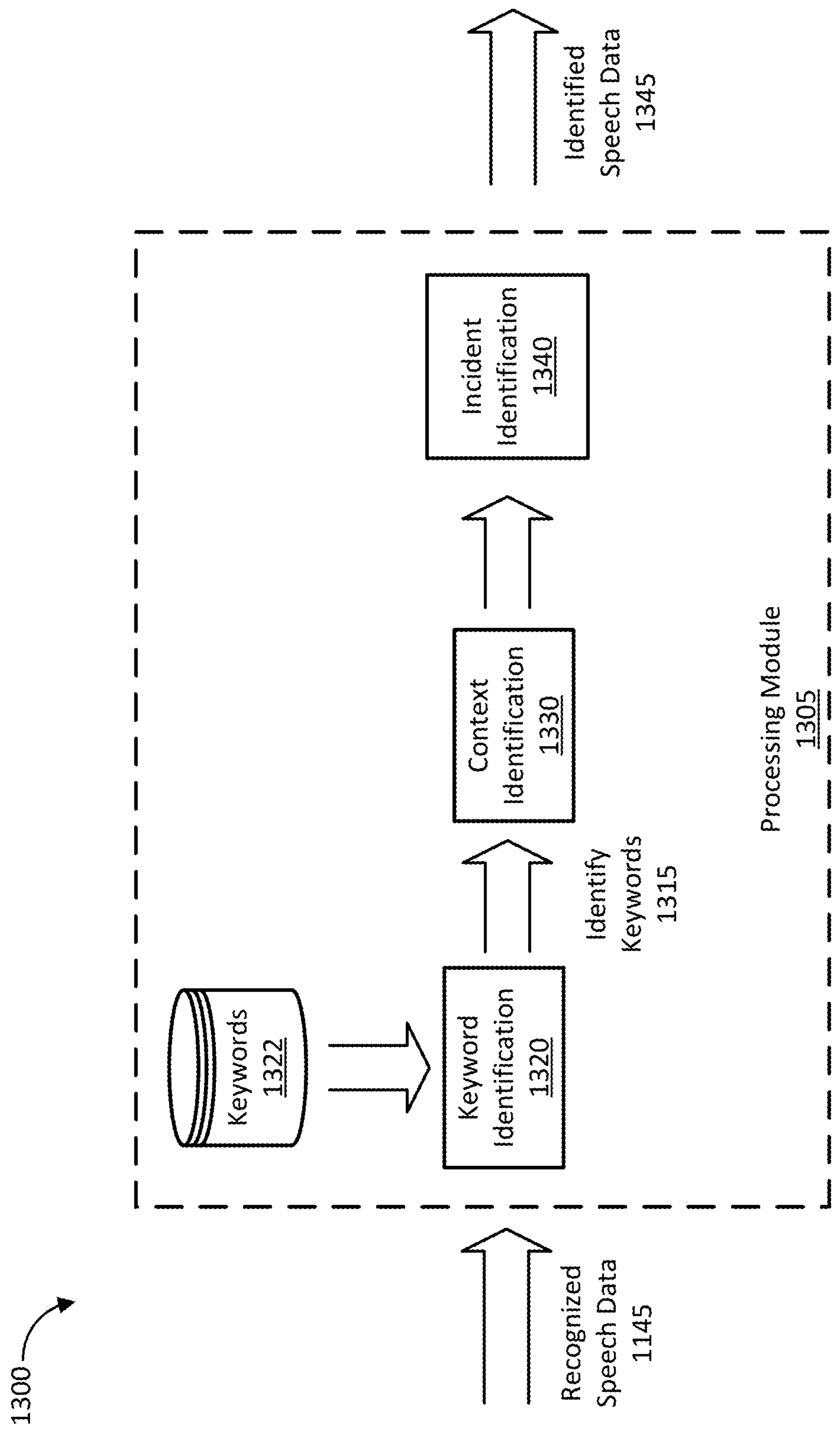
FIG. 13 illustrates an example incident identification system that may be locally or remotely executed, according to an embodiment herein.

The speech recognition system 1200, along with the incident identification system 1300 described in greater detail with respect to FIG. 13, may be used to perform one or more of the incident identification functions described herein. In some embodiments, the speech recognition system 1200 may be used as part of the dynamic prominence functionality to identify incident factor(s) of an incident event. For example, the speech recognition system 1200 may identify keywords in an audio stream from the client device 540_h_ indicating that a person is trapped in the cubicle 506_f_ In other embodiments, the speech recognition system 1200 may be used as part of the identification functionality to identify person(s) of interest. For example, the speech recognition system 1200 may identify an accent that is a identifying characteristic of a person of interest. In still other embodiments, the speech recognition system 1200 may be used to provide a live transcription of a speaking participant's audio stream or a transcription of audio streams exchanged during the identification session.

To perform speech recognition, the speech recognition system 1200 may include a speech recognition module 1205. The speech recognition module 1205 may receive audio data 1210. The audio data 1210 may correspond to audio captured by the client device 340*a*, for example by a microphone. In other embodiments, the audio data 1210 may be received from the video conference provider 310. The audio data 1210 may be a recording of an audio track or may be a transcript of the audio track. The speech recognition module 1205 may be or include a speech recognition system or model as known in the art. The following is an example speech recognition module following an example speech recognition process; however, it should be understood that other speech recognition modules or processes may be used.

Once the audio data 1210 is received by the speech recognition module 1205, the audio data 1210 may be processed by a feature enhancement and extraction module 1215. The feature enhancement and extraction module 1215 may analyze the audio data for features corresponding to words and then enhance and extract any identified features. The identified features may correspond to audio waveforms present in human speech.

The speech recognition module 1205 may also include a recognizer 1220. The recognizer 1220 may receive the identified features from the audio data 1210. The recognizer 1220 may employ an acoustic model 1225 and a vocabulary database 1230 to determine or associate the identified features in the audio data 1210 to one or more words.

In an example embodiment, the acoustic model 1225 may analyze the raw audio waveforms in the identified features and determine a corresponding phoneme for each waveform. In some embodiments, this is performed at the character or subword level. The vocabulary database 1230 may be a language model. The vocabulary database 1230 may include a rules database 1240 and a word database 1235. The rules database 1240 may provide various rules for speech, allowing the recognizer to discard any association of identified features (e.g., audio waveforms) to phonemes that are improbable given the constraints of proper grammar and the topic of discussion. Once an appropriate mapping of the identified features to phonemes is generated, the recognizer 1220 may determine words associated with the phonemes. The words may be based on the words database 1235.

Once the phonemes are associated with respective words, recognized speech data 1245 is generated. It should be understood that this process may be performed nearly instantaneously. For example, the speech recognition module 1205 may generate the recognized speech data 1245 during the meeting as the audio streams are being received by the video conference provider 310 or another system that is hosting the speech recognition system 1200. The recognized speech 1245 may be then used to perform one or more incident identification functions, such the dynamic prominence functionality or the identification functionality.

Turning now to FIG. 13, an example incident identification system 1300 is provided. The incident identification system 1300 may perform one or more of the functions of the dynamic prominence functionality or the identification functionality as described herein. The incident identification system 1300 may include processing module 1305 that is used to perform one or more of the privatization functions described herein. For example, in one case, the recognized speech 1245 may be received from the speech recognition system 1200 to identify an incident from an audio stream received from the client device 540*h*.

The recognized speech 1245 may be received by the keyword identification system 1320. The keyword identification system 1320 may identify one or more keywords in the recognized speech data 1345. The database of known keywords 1322 may be queried to identify any keywords in the track of recognized speech data 1345. Keywords in the keyword database 1322 may be based on keywords associated with common incident events. For example, keywords may include words like "fire," "help, "stop," and the like. In some embodiments, keywords may include one or more emotion expressions, such as screaming or crying.

It should be understood that a keyword may include more than one word. For example, "get out of here" may be a "keyword" as indicating that an individual is seeking a means of escape. Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "shoot," "shot," and "shooting." In some examples each of these may be a distinct keyword, while in other examples, the variants may be associated with a base term, e.g., "shoot," that is used as the keyword. However, any suitable approach to recognizing keywords may be used.

In some embodiments, a keyword may include or be an audio signature or audio activity. For example, a keyword may include screaming, or other distinct audios sounds that are known to correspond with incidents. In other embodiments, a keyword may include or be an accent or other vocal feature, such as a lisp.

If one or more keywords 1315 is recognized, the processing module 1305 then may identify a context 1330 associated with the keyword 1315. In this example, to identify a context, the processing module 1305 may employ a trained machine learning ("ML") technique to semantically analyze the speech or transcript associated with the identified keyword 1315 to determine additional related keywords and/or descriptors. To perform the analysis, the trained ML technique may be provided the keyword(s) and a predetermined number of words near the keyword, e.g., preceding and following the keyword(s), such as five to ten words preceding and following the keyword(s). Words such as articles (e.g., "a", "the") or prepositions such as "of" or "for" may be omitted from the word count in some examples.

Since people may use jargon or colloquial terms to refer to particular actions, the context identification 1330 functionality may normalize recognized words to specific meanings. For example, the terms "kids," "offspring," "kiddos," "little ones," etc. all refer to children. Thus, the context identification 1330 functionality may map such terms to have a single meaning (e.g., children). Such mappings may be provided for multiple different phrases and corresponding terms. Similarly, synonyms or words related to keywords may also be identified.

Once the context identification 1330 has identified the one or more keywords 1315 and identified the context of the identified keywords 1315, the processing module 1305 may perform an incident identification 1340. The processing module 1305 may determine, based on the identification of the keywords 1315, and the context of the keywords, that the keywords 1315 correspond to an incident event, contain incident factor(s), or include one or more identifying characteristics. Based on predetermined keywords and context, the incident identification 1340 may determine an incident event corresponding to identified keywords 1315. For example, the incident identification 1340 may determine that the incident event 510 is a fire based on the identified keywords “fire” or “burning” in an audio stream received from the client device 540*h*. In another example, the incident identification 1340 may identify client devices in which individuals are in need of aid. For example, the incident identification 1340 may be able to flag the client device 540*h* for the authorized agency device as potentially needing rescue assistance based on the identified keywords “help” or “save me.”

In other embodiment, the incident identification 1340 may identify incident factor(s) in a multimedia stream based on the identified keywords, such as identifying screaming in the keywords 1315. In still another embodiment, the incident identification 1340 may identify one or more identifying characteristics in a multimedia stream, such as identifying an accent of a person of interest.

The incident identification 1340 may process the keywords 1315 in the audio data to generate identified speech data 1345. The identified speech data 1345 may include speech data that has been identified as being relevant to an incident event, as containing incident factor(s), or containing one or more identifying characteristics, as described above. In some embodiments, the identified speech data 1345 may be used to generate an alert for the authorized agency device to flag a client device corresponding to the audio stream containing the identified speech data 1345.

Figure 14:
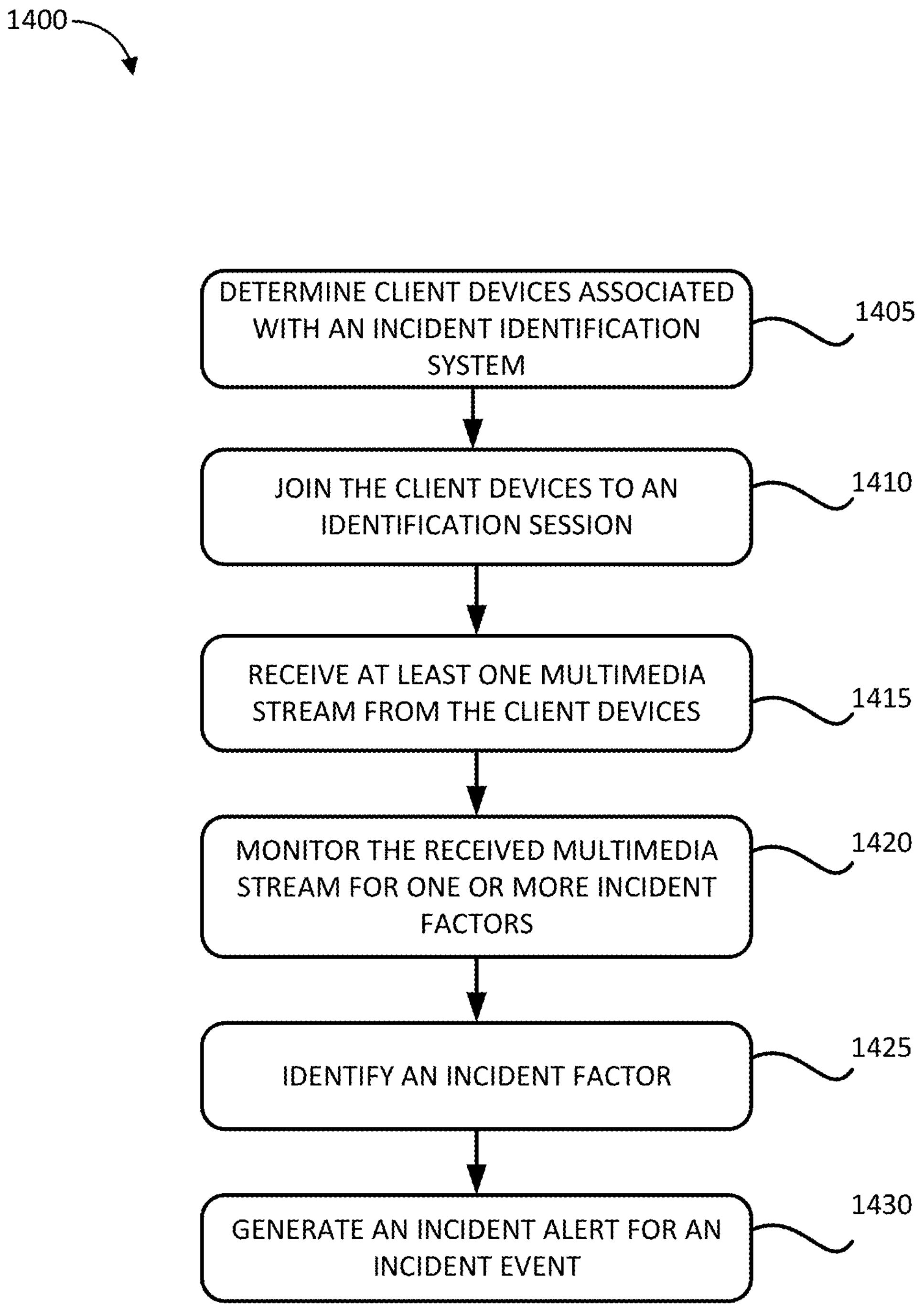
FIG. 14 illustrates an example method for providing an incident identification system, according to an embodiment herein.

Referring now to FIG. 14, a flowchart of an example method 1400 for providing an incident identification system is provided, according to an embodiment herein. The description of the method 1400 in FIG. 14 will be made with reference to FIGS. 3-13, however any suitable system according to this disclosure may be used, such as the example systems 100 and 200, shown in FIGS. 1 and 2.

The method 1400 may include steps 1405 and 1410. At step 1405, a plurality of client devices associated with an incident identification system may be determined. For example, the video conference provider 310 may determine that the client devices 440*a*-440*j* are part of the incident identification system 400. At step 1410, one or more client devices may be joined to an identification session. For example, one or more of the client devices 440*a*-440*j* may be joined to an incident identification session by the video conference provider 310. As noted above, the one or more client devices 440*a*-440*j* may be automatically joined to the incident identification session without any input from the client device 440*a*-440*j* side.

The method 1400 may also include steps 1415 and 1420. At step 1415, at least one multimedia stream from each of the client devices may be received. For example, the video conference provider 310 may receive at least one multimedia stream from each of the client devices 440*a*-440*j*. At step 1420, the video conference provider 310 may monitor the received multimedia streams for one or more incident factors. Monitoring the received multimedia streams for one or more incident factors may include analyzing the received multimedia streams for one or more of: one or more keywords, one or more audio signatures, an increase in audio activity, an increase in visual activity, or one or more visual signatures. In some embodiments, monitoring the received multimedia streams for one or more incident factors may include performing speech recognition on the first audio stream from the first client device and identifying, based on the speech recognition, one or more keywords indicating the one or more incident factors. In other embodiments, monitoring the received multimedia streams for one or more incident factors includes monitoring, by the video conference provider, a first audio stream for the one or more incident factors, wherein the incident factors comprise an increase in audio activity or monitoring, by the video conference provider, a first video stream for the incident factors, wherein the incident factors comprise an increase in visual activity.

The method 1400 may also include steps 1425 and 1430. At step 1425, an incident factor may be identified in the received multimedia streams. For example, the video conference provider 310 may identify an incident factor in the received multimedia streams. In some embodiments, step 1425 may include determining, by the video conference provider, an increase in activity in a received multimedia stream and determining, by the video conference provider, the incident factor based on the increase in activity. An increase in activity in the received multimedia streams may include one or more of an increase in audio activity, an increase in visual activity, or an increase in chat messaging activity. At step 1430, an incident alert for an incident event may be generated based on identifying the incident factor.

In some embodiments, the method 1400 may also include, responsive to the incident alert for the incident event, transmitting, by the video conference provider, a request to join an authorized agency device to the identification session and joining, by the video conference provider, the authorized agency device to the identification session. The method 1400 may further include granting, by the video conference provider 310, host controls of the identification session to the authorized agency device 360, and transmitting, by the video conference provider 310, a notification that the authorized agency device 360 is to host the identification session to the one or more client devices 440*a*-440*j* in the identification session.

In some embodiments, the method 1400 may also include receiving, from the authorized agency device 360, a request to control equipment corresponding to a first multimedia stream received from a first client device, transmitting, by the video conference provider, a signal to the first client device to control the equipment corresponding to the first multimedia stream, and receiving, by the video conference provider, a modified first multimedia stream from the first client device based on the signal to control the equipment corresponding to the first multimedia stream.

The method 1400 may also include determining, by the video conference provider, a first client device and a second client device associated with the incident factor, determining, by the video conference provider, a first location of the first client device and a second location the second client device, and determining, by the video conference provider, an event location based on the first location and the second location. In such cases, the method 1400 may further include generating, by the video conference provider, a map of the event location and transmitting, to the authorized agency device 360, the map of the event location.

In some embodiments, a map of the increase in activity may be generated. For example, the video conference provider 310 may determine a location for each of the client devices 440*a*-440*j*, determine an activity level for a respective multimedia stream for each of the client devices 440*a*-440*j*, and generate a heat map based on the activity level for each of the respective multimedia streams.

In some embodiments, the method 1400 may include generating, by the video conference provider, a snippet of a multimedia stream comprising the one or more incident factors identified by the video conference provider and transmitting, to the authorized agency device, the snippet of the multimedia stream comprising the one or more incident factors.

Figure 15:
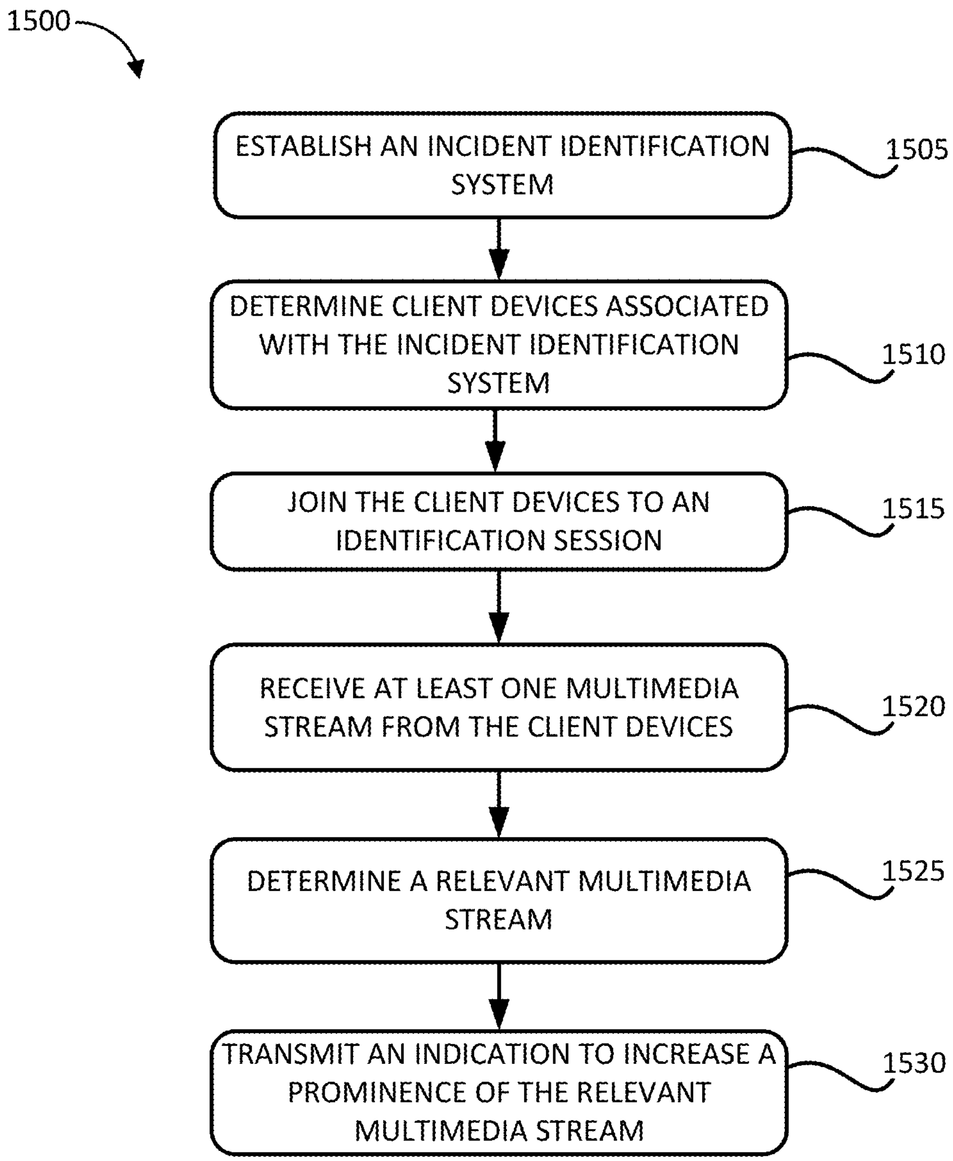
FIG. 15 illustrates an example method for providing dynamic prominence during an identification session, according to an embodiment herein.

Referring now to FIG. 15, a flowchart of an example method 1500 for providing dynamic prominence during a virtual meeting/session is illustrated, according to an embodiment herein. The description of the method 1500 in FIG. 15 will be made with reference to FIGS. 3-13, however any suitable system according to this disclosure may be used, such as the example systems 100 and 200, shown in FIGS. 1 and 2.

The method 1500 may include steps 1505 and 1510. At step 1505, an incident identification system may be established. For example, the video conference provider 310 may establish the incident identification system 400 or 500. At step 1510, a plurality of client devices associated with the incident identification system may be determined. For example, the video conference provider 310 may determine that the client devices 440*a*-440*j* are associated with the incident identification system 400.

The method 1500 may also include steps 1515 and 1520. At step 1515, one or more client devices may be joined to an identification session. For example, the video conference provider 310 may join one or more of the client devices 440*a*-440*j* to an incident identification session. At step 1520, at least one multimedia stream may be received from each of the client devices. For example, the video conference provider 310 may receive at least one multimedia stream from each of the client devices 440*a*-440*j*.

The method 1500 may include steps 1525 and 1530. At step 1525, a relevant multimedia stream from received multimedia streams may be determined. For example, a dynamic prominence functionality hosted by the video conference provider 310 may determine a relevant multimedia stream from the multimedia streams received from the client devices 440*a*-440*j*. In some embodiments, the step 1525 may further include identifying, by the video conference provider, one or more incident factors present in a first multimedia stream of the received multimedia streams and determining, by the video conference provider, the first multimedia stream to be the relevant multimedia stream based on the one or more incident factors present in the first multimedia stream. For example, if the first multimedia stream includes a first audio stream, the video conference provider may identify one or more incident factors in the first multimedia stream by performing speech recognition on the first audio stream and identifying, based on the speech recognition, one or more keywords indicating incident factors in the first audio stream. If the first multimedia stream includes a first video stream, then the video conference provider may identify one or more incident factors present in the first multimedia stream by performing visual recognition on the first video stream and identifying, based on the visual recognition, visual activity indicating incident factors in the first video stream. In still further cases, if the first multimedia stream includes a first audio stream, then the video conference provider may identify the one or more incident factors present in the first multimedia stream by performing audio recognition on the first audio stream and identifying, based on the audio recognition, audio activity indicating the one or more incident factors.

In some embodiments, step 1525 may further include identifying, by the video conference provider, a first audio signature in a first received multimedia stream, identifying, by the video conference provider, a second audio signature in the first received multimedia stream, determining, by the video conference provider, the first audio signature to be irrelevant (e.g., not relevant) to the identification session, determining, by the video conference provider, the second audio signature to be relevant to the identification session, and determining, by the video conference provider, the first received multimedia stream to be a relevant multimedia stream based on the second audio signature.

In other embodiments, step 1525 may further include analyzing, by the video conference provider, the received multimedia streams for one or more incident factors, wherein the one or more incident factors comprise one or more of: one or more keywords, one or more audio signatures, an increase in audio activity, an increase in visual activity, or one or more visual signatures, and determining, by the video conference provider, a relevant multimedia stream based on the presence of the one or more incident factors in the multimedia stream. In such cases, the method 1500 may further include, responsive to determining the multimedia stream to be a relevant multimedia stream based on the presence of the one or more incident factors in the multimedia stream, generating, by the video conference provider, an incident alert for an incident event based on the one or more incident factors. The method 1500 may further include, responsive to the incident alert for the incident event, transmitting, by the video conference provider, a request to join an authorized agency device to the identification session and joining, by the video conference provider, the authorized agency device to the identification session.

At step 1530, an indication to increase a prominence of a relevant multimedia stream during the identification session may be transmitted by the video conference provider. For example, the video conference provider 310 may transmit an indication to increase a display size of the relevant multimedia stream during the identification session relative to a size of other multimedia streams or the video conference provider 310 may transmit an indication to increase an audio volume of the relevant multimedia stream during the identification session relative to a volume of the other multimedia streams. In some embodiments, the incident identification session may include at least one breakout room. In such cases, step 1530 may include determining, by the video conference provider, a breakout room assignment for the relevant multimedia stream and transmitting, by the video conference provider, the relevant multimedia stream to the authorized agency device based on the breakout room assignment.

In some embodiments, the method 1500 may further include determining, by the video conference provider, a location for each of the one or more client devices, determining, by the video conference provider, an activity level for a multimedia stream, and generating, by the video conference provider, a heat map based on the activity level for each of the multimedia streams.

In some embodiments, the method 1500 may further include joining, by the video conference provider, a first authorized agency device to the identification session and joining, by the video conference provider, a second authorized agency device to the identification session. In such cases, step 1525 may further include identifying, by the video conference provider, one or more incident factors present in a first multimedia stream and determining, by the video conference provider, the first multimedia stream to be a relevant multimedia stream based on the one or more incident factors present in the first multimedia stream. Additionally, in such cases, step 1530 may further include transmitting, by the video conference provider, an indication to increase the prominence of the relevant multimedia stream for the first authorized agency device based on the one or more incident factors, and transmitting, by the video conference provider, an indication to decrease the prominence of the relevant multimedia stream for the second authorized agency device based on the one or more incident factors. As discussed above, the one or more incident factors may include one or more of: one or more keywords, one or more audio signatures, an increase in audio activity, an increase in visual activity, or one or more visual signatures. For example, speech recognition may be performed on a multimedia stream to identify one or more keywords indicating the one or more incident factors.

Figure 16:
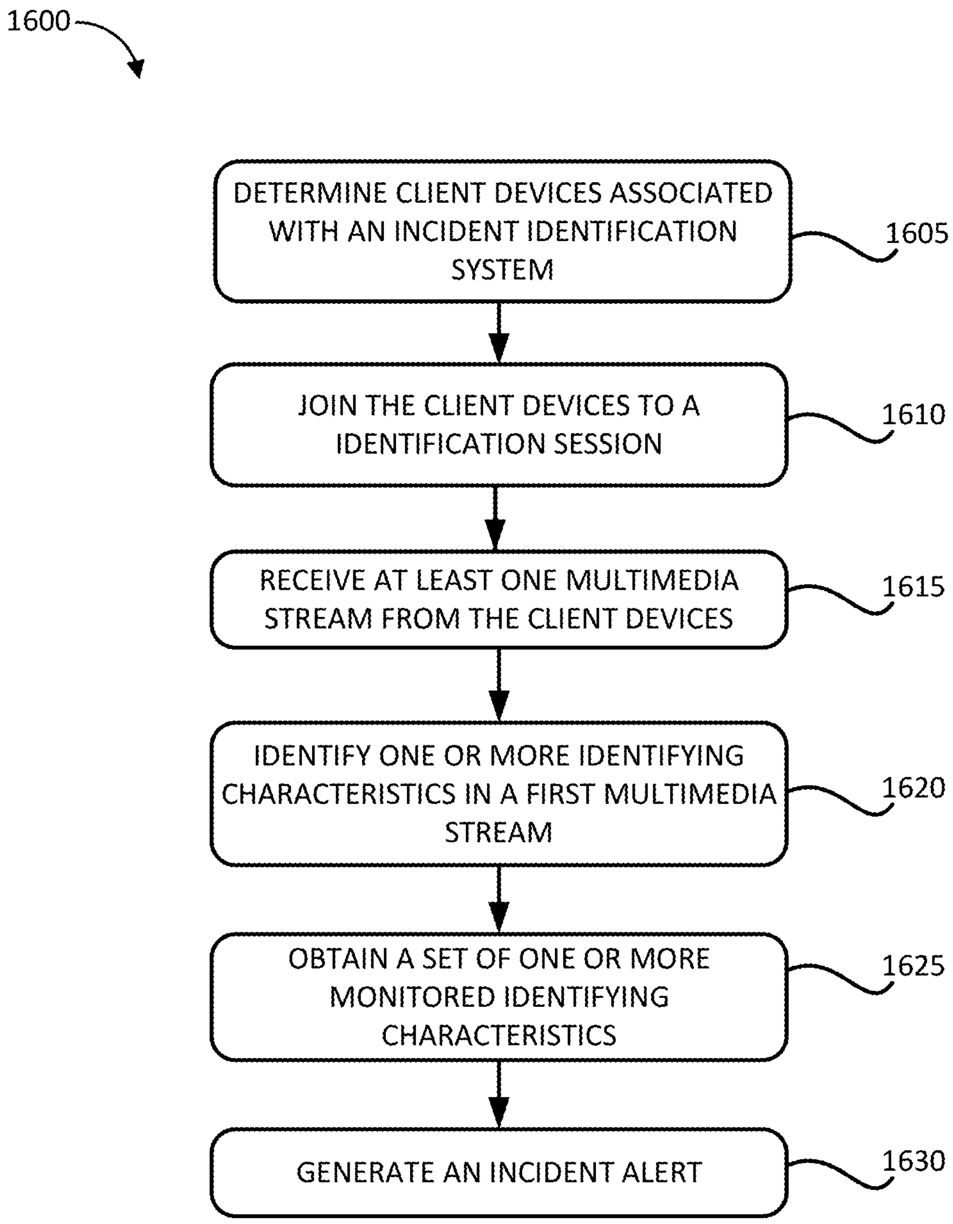
FIG. 16 illustrates an example method for providing identification of person(s) of interest, according to an embodiment herein.

Referring now to FIG. 16, a flowchart of an example method 1600 for providing identification of person(s) of interest is illustrated, according to an embodiment herein. The description of the method 1600 in FIG. 16 will be made with reference to FIGS. 3-13, however any suitable system according to this disclosure may be used, such as the example systems 100 and 200, shown in FIGS. 1 and 2.

The method 1600 may include steps 1605 and 1610. At step 1605, a plurality of client devices associated with an incident identification system may be determined. For example, the video conference provider 310 may determine that the client devices 440*a*-440*j* are part of the incident identification system 400. At step 1610, one or more client devices may be joined to an identification session. For example, one or more of the client devices 440*a*-440*j* may be joined to an incident identification session by the video conference provider 310. As noted above, the one or more client devices 440*a*-440*j* may be automatically joined to the incident identification session without any input from the client device 440*a*-440*j* side.

The method 1600 may also include steps 1615 and 1620. At step 1615, at least one multimedia stream from each of the one or more of the client devices may be received. For example, the video conference provider 310 may receive at least one multimedia stream from each of the client devices 440*a*-440*j*. At step 1620, one or more identifying characteristics may be identified in a first multimedia stream from the received multimedia streams. For example, a identification functionality of the video conference provider 310 may identify one or more identifying characteristics in a video stream received from the client device 440*a*. In some embodiments, identifying the one or more identifying characteristics in the first multimedia stream from the received multimedia streams may include performing visual recognition on each of the multimedia streams or performing audio recognition on each of the multimedia streams. Then, based on the visual or audio recognition, identifying the one or more identifying characteristics in the first multimedia stream.

The method 1600 may also include steps 1625 and 1630. At step 1625, a set of one or more monitored identifying characteristics may be obtained from a database. For example, the video conference provider 310 may obtain one or more monitored identifying characteristics from a identification database. In some embodiments, monitored identifying characteristics may be obtained by manual input or based on previously identified identifying characteristics from a video stream. For example, a identifying characteristic may be received by the video conference provider 310 and then added to the set of monitored identifying characteristics in the database.

At step 1630, an incident alert may be generated. For example, the video conference provider 310 may generate an incident alert based on the one or more identifying characteristics and the set of one or more monitored identifying characteristics.

In some embodiments, the method 1600 may further include comparing, by the video conference provider, the one or more identifying characteristics to the set of monitored identifying characteristics and determining, by the video conference provider, that the one or more identifying characteristics correspond to an incident event based on the comparison. For example, the video conference provider may determine that the one or more identifying characteristics correspond to the incident event based on the comparison by determining, by the video conference provider, that there is a match of the one or more identifying characteristics to the set of monitored identifying characteristics or determining, by the video conference provider, that there is not a match of the one or more identifying characteristics to the set of one or more monitored identifying characteristics.

In some embodiments, the method 1600 may further include responsive to the incident alert, transmitting, by the video conference provider, a request to join an authorized agency device to the identification session and joining, by the video conference provider, the authorized agency device to the identification session. As discussed above, in some embodiments once an authorized agency device is joined to the identification session, a signal to control equipment of one or more of the client devices 440*a*-440*j* may be transmitted to the authorized agency device.

In other embodiments, the method 1600 may further include determining, by the video conference provider, a first location of a first client device associated with the first multimedia stream. In such cases, the method 1600 may further include identifying, by the video conference provider, a second multimedia stream from the received multimedia streams based on the one or more monitored identifying characteristics, determining, by the video conference provider, a second location of a second client device associated with the second multimedia stream, and generating, by the video conference provider, a map of the first location and the second location. In some embodiments, where an authorized agency device is joined to the identification session, the method 1600 may include transmitting, by the video conference provider, the map of the first location and the second location to the authorized agency device. In some embodiments, the method 1600 may also include determining, by the video conference provider, a second client device within a predetermined vicinity of the first location and transmitting, to the second client device, a request to join the identification session, wherein the one or more client devices do not include the second client device.

In some embodiments, the method 1600 may further include comparing, by the video conference provider, the one or more identifying characteristics to the one or more monitored identifying characteristics, determining, by the video conference provider, a match confidence of the one or more identifying characteristics to the set of one or more monitored identifying characteristics, and generating, by the video conference provider, the incident alert based on the match confidence.

In some embodiments, the video conference provider may identify the one or more identifying characteristics in the first multimedia stream from the received multimedia streams by analyzing each of the received multimedia streams for one or more of: one or more keywords, one or more audio signatures, or one or more visual signatures.

Figure 17:
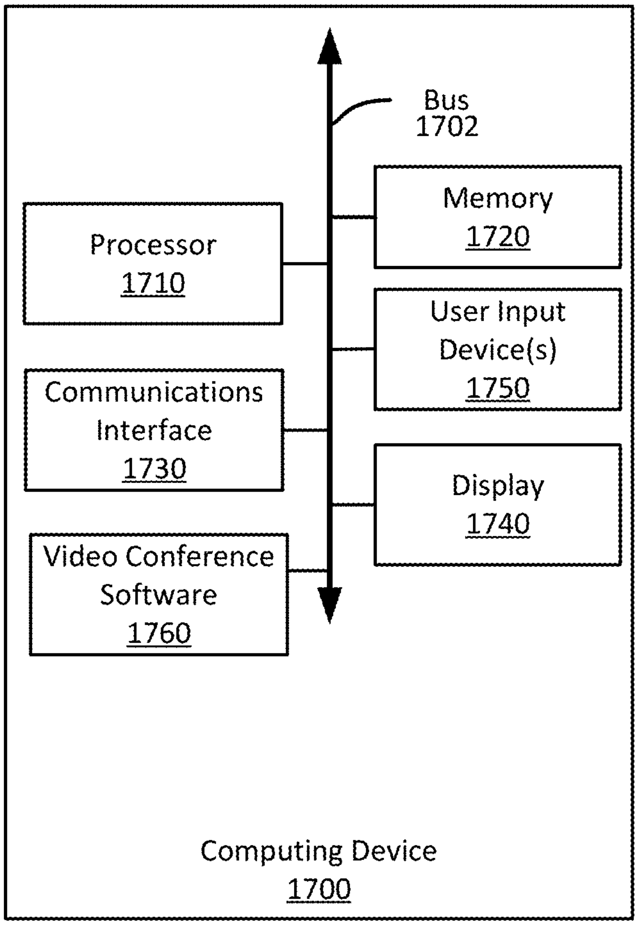
FIG. 17 shows an example computing device suitable for providing an incident identification system, according to this disclosure.

Referring now to FIG. 17, FIG. 17 shows an example computing device 1700 suitable for use in example systems or methods providing an incident identification system. The example computing device 1700 includes a processor 1710 which is in communication with the memory 1720 and other components of the computing device 1700 using one or more communications buses 1702. The processor 1710 is configured to execute processor-executable instructions stored in the memory 1720 to perform one or more methods for providing an incident identification system, such as part or all of the example method 1400, described above with respect to FIG. 14, one or more methods for providing dynamic prominence during a virtual meeting/session, such as part of or all of the example method 1500, described above with respect to FIG. 15, or one or more methods for providing identification of person(s) of interest, such as part or all of the example method 1600, described above with respect to FIG. 16. The computing device, in this example, also includes one or more user input devices 1750, such as a keyboard, mouse, touchscreen, video input device (e.g., one or more cameras), microphone, etc., to accept user input. The computing device 1700 also includes a display 1740 to provide visual output to a user.

The computing device 1700 also includes a communications interface 1730. In some examples, the communications interface 1730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a method comprising: establishing, by a video conference provider, an incident identification system; determining, by the video conference provider, a plurality of client devices associated with the incident identification system; joining, by the video conference provider, one or more of the plurality of client devices to an identification session; receiving, by the video conference provider, at least one multimedia stream from each of the one or more client devices; determining, by the video conference provider, a relevant multimedia stream from the received multimedia streams; and transmitting, by the video conference provider, an indication to increase a prominence of the relevant multimedia stream during the identification session.

Example 2 is the method of any previous or subsequent Example, wherein the incident identification system is established in response to receiving a request from an administrator of a facility where an incident event has occurred.

Example 3 is the method of any previous or subsequent Example, wherein determining, by the video conference provider, the relevant multimedia stream comprises: identifying, by the video conference provider, one or more incident factors present in a first multimedia stream of the received multimedia streams; and determining, by the video conference provider, the first multimedia stream to be relevant based on the one or more incident factors.

Example 4 is the method of any previous or subsequent Example, wherein the first multimedia stream comprises a first audio stream, and wherein identifying, by the video conference provider, the one or more incident factors present in the first multimedia stream comprises: performing speech recognition on the first audio stream; and identifying, based on the speech recognition, one or more keywords indicating the one or more incident factors are present in the first audio stream.

Example 5 is the method of any previous or subsequent Example, wherein the first multimedia stream comprises a first video stream, and wherein identifying, by the video conference provider, the one or more incident factors present in the first multimedia stream comprises: performing visual recognition on the first video stream; and identifying, based on the visual recognition, visual activity indicating the one or more incident factors are present in the first video stream.

Example 6 is the method of any previous or subsequent Example, wherein the first multimedia stream comprises a first audio stream, and wherein identifying, by the video conference provider, the one or more incident factors present in the first multimedia stream comprises: performing audio recognition on the first audio stream; and identifying, based on the audio recognition, audio activity indicating the one or more incident factors are present in the first audio stream.

Example 7 is the method of any previous or subsequent Example, the indication to increase a display size of the relevant multimedia stream during the identification session relative to a size of other multimedia streams.

Example 8 is the method of any previous or subsequent Example, wherein the indication to increase an audio volume of the relevant multimedia stream during the identification session relative to a volume of the other multimedia streams.

Example 9 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish, by a video conference provider, an incident identification system; determine, by the video conference provider, a plurality of client devices associated with the incident identification system; join, by the video conference provider, one or more of the plurality of client devices to an identification session; receive, by the video conference provider, at least one multimedia stream from each of the one or more client devices; determine, by the video conference provider, a relevant multimedia stream from the received multimedia streams; and transmit, by the video conference provider, an indication to increase the prominence of the relevant multimedia stream during the identification session.

Example 10 is the system of any previous or subsequent Example, wherein the instructions to determine, by the video conference provider, the relevant multimedia stream further comprise processor-executable instructions stored in the non-transitory computer-readable medium to: determine, by the video conference provider, a first audio signature and a second audio signature in a first multimedia stream; identify, by the video conference provider, the first audio signature to be not relevant to the identification session and the second audio signature to be relevant to the identification session; and determine, by the video conference provider, the first multimedia stream to be relevant.

Example 11 is the system of any previous or subsequent Example, wherein the instructions to determine, by the video conference provider, the relevant multimedia stream further comprise processor-executable instructions stored in the non-transitory computer-readable medium to: analyze, by the video conference provider, the received multimedia streams for one or more incident factors, wherein the one or more incident factors comprise one or more of: one or more keywords; one or more audio signatures; an increase in audio activity; an increase in visual activity; or one or more visual signatures; and determine, by the video conference provider, a multimedia stream to be relevant based on the presence of one or more incident factors in the multimedia stream.

Example 12 is the system of any previous or subsequent Example, wherein the processor is configured to execute further processor-executable instructions stored in the non-transitory computer-readable medium to: responsive to determining the multimedia stream to be relevant, generate, by the video conference provider, an incident alert for an incident event based on the one or more incident factors.

Example 13 is the system of any previous or subsequent Example, wherein the processor is configured to execute further processor-executable instructions stored in the non-transitory computer-readable medium to: responsive to the incident alert for the incident event, transmit, by the video conference provider, a request to join an authorized agency device to the identification session; and join, by the video conference provider, the authorized agency device to the identification session.

Example 14 is the system of any previous or subsequent Example, wherein the identification session comprises at least one breakout room, and wherein the instructions to transmit, by the video conference provider, the indication to increase the prominence of the relevant multimedia stream during the identification session cause the processor to execute further processor-executable instructions stored in the non-transitory computer-readable medium to: determine, by the video conference provider, a breakout room assignment for the relevant multimedia stream; and transmit, by the video conference provider, the relevant multimedia stream to the authorized agency device based on the breakout room assignment.

Example 15 is the system of any previous or subsequent Example, wherein the processor is configured to execute further processor-executable instructions stored in the non-transitory computer-readable medium to: determine, by the video conference provider, a location for each of the one or more client devices; determine, by the video conference provider, an activity level for a respective multimedia stream for each of the one or more client devices; and generate, by the video conference provider, a heat map based on the activity level for each of the respective multimedia streams.

Example 16 is a non-transitory computer-readable medium comprising processor-executable instructions configured to cause one or more processors to: establish, by a video conference provider, an incident identification system; determine, by the video conference provider, a plurality of client devices associated with the incident identification system; join, by the video conference provider, one or more of the plurality of client devices to an identification session; receive, by the video conference provider, at least one multimedia stream from each of the one or more client devices; determine, by the video conference provider, a relevant multimedia stream from the received multimedia streams; and transmit, by the video conference provider, an indication to increase the prominence of the relevant multimedia stream during the identification session.

Example 17 is the non-transitory computer-readable medium of any previous or subsequent Example, wherein the processor is configured to execute further processor-executable instructions stored in the non-transitory computer-readable medium to: join, by the video conference provider, a first authorized agency device to the identification session; and join, by the video conference provider, a second authorized agency device to the identification session.

Example 18 is the non-transitory computer-readable medium of any previous or subsequent Example, wherein the instructions to determine, by the video conference provider, the relevant multimedia stream further comprise processor-executable instructions stored in the non-transitory computer-readable medium to: identify, by the video conference provider, one or more incident factors present in a first multimedia stream of the received multimedia streams; and determine, by the video conference provider, the first multimedia stream to be the relevant multimedia stream based on the one or more incident factors present in the first multimedia stream.

Example 19 is the non-transitory computer-readable medium of any previous or subsequent Example, wherein the instructions to transmit, by the video conference provider, the indication to increase the prominence of the relevant multimedia stream during the identification session further comprise processor-executable instructions stored in the non-transitory computer-readable medium to: transmit, by the video conference provider, an indication to increase the prominence of the relevant multimedia stream for the first authorized agency device based on the presence of the one or more incident factors.

Example 20 is the non-transitory computer-readable medium of any previous or subsequent Example, wherein the one or more incident factors comprise one or more of: one or more keywords; one or more audio signatures; an increase in audio activity; an increase in visual activity; or one or more visual signatures.

Example 21 is the non-transitory computer-readable medium of any previous or subsequent Example, wherein the received multimedia streams comprises a first audio stream from a first client device, and the instructions to identify, by the video conference provider, the one or more incident factors in the first multimedia stream further comprise processor-executable instructions stored in the non-transitory computer-readable medium to: perform speech recognition on the first audio stream from the first client device; and identify, based on the speech recognition, one or more keywords indicating the one or more incident factors.

Example 22 is a method comprising: determining, by a video conference provider, a plurality of client devices associated with an incident identification system; joining, by the video conference provider, one or more of the plurality of client devices to an identification session; receiving, by the video conference provider, at least one multimedia stream from each of the one or more client devices; monitoring, by the video conference provider, the received multimedia streams for one or more incident factors; identifying, by the video conference provider, an incident factor in at least one received multimedia stream; and generating, by the video conference provider, an incident alert for an incident event based on identifying the incident factor.

Example 23 is the method of any previous or subsequent Example, wherein the incident identification system is established in response to receiving a request from an administrator of a facility where the incident event has occurred.

Example 24 is the method of any previous or subsequent Example, the method further comprising: responsive to the incident alert for the incident event, transmitting, by the video conference provider, a request to join an authorized agency device to the identification session; and joining, by the video conference provider, the authorized agency device to the identification session.

Example 25 is the method of any previous or subsequent Example, the method further comprising: determining, by the video conference provider, a first client device and a second client device associated with the incident factor; determining, by the video conference provider, a first location of the first client device and a second location the second client device; and determining, by the video conference provider, an event location based on the first location and the second location.

Example 26 is the method of any previous or subsequent Example, the method further comprising: generating, by the video conference provider, a map of the event location; and transmitting, to the authorized agency device, the map of the event location.

Example 27 is the method of any previous or subsequent Example, wherein the received multimedia streams comprise a first audio stream from a first client device, and monitoring, by the video conference provider, the received multimedia streams for one or more incident factors comprises: performing speech recognition on the first audio stream; and identifying, based on the speech recognition, one or more keywords indicating the one or more incident factors are present.

Example 28 is the method of any previous or subsequent Example, wherein the received multimedia streams comprise a first audio stream from a first client device, and the incident factors comprise an increase in audio activity in the first audio stream.

Example 29 is the method of any previous or subsequent Example, wherein the received multimedia streams comprise a first video stream from a first client device, and the incident factors comprise an increase in visual activity in the first video stream.

Example 30 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: determine, by a video conference provider, a plurality of client devices associated with an incident identification system; join, by the video conference provider, one or more of the plurality of client devices to an identification session; receive, by the video conference provider, at least one multimedia stream from each of the one or more client devices; monitor, by the video conference provider, the received multimedia streams for one or more incident factors; identify, by the video conference provider, an incident factor in the received multimedia streams; and generate, by the video conference provider, an incident alert for an incident event based on identifying the incident factor.

Example 31 is the system of any previous or subsequent Example, wherein: the instructions to receive the multimedia streams from each of the one or more client devices further comprise processor-executable instructions stored in the non-transitory computer-readable medium to: receive, by the video conference provider, a first plurality of multimedia streams from a first plurality of client devices, wherein the one or more client devices comprise the first plurality of client devices; and the instructions to identify, the video conference provider, the incident factor in the received multimedia streams further comprise processor-executable instructions stored in the non-transitory computer-readable medium to: determine, by the video conference provider, an increase in activity in the first plurality of multimedia streams; and determine, by the video conference provider, the incident factor based on the increase in activity in the first plurality of multimedia streams.

Example 32 is the system of any previous or subsequent Example, wherein the increase in activity in the first plurality of multimedia streams comprises one or more of: an increase in audio activity; an increase in visual activity; or an increase in chat messaging activity.

Example 33 is the system of any previous or subsequent Example, wherein the processor is configured to execute further processor-executable instructions stored in the non-transitory computer-readable medium to: generate, by the video conference provider, a map of the increase in activity.

Example 34 is the system of any previous or subsequent Example, wherein the instructions to generate, by the video conference provider, the map of the increase in activity further comprise processor-executable instructions stored in the non-transitory computer-readable medium to: determine, by the video conference provider, a location for each of the client devices in the first plurality of client devices; determine, by the video conference provider, an activity level for a respective multimedia stream of the first plurality of multimedia streams for each of the client devices; and generate, by the video conference provider, a heat map based on the activity level for each of the respective multimedia streams.

Example 35 is the system of any previous or subsequent Example, wherein the processor is configured to execute further processor-executable instructions stored in the non-transitory computer-readable medium to: responsive to the incident alert for the incident event, transmit, by the video conference provider, a request to join an authorized agency device to the identification session; and join, by the video conference provider, the authorized agency device to the identification session.

Example 36 is the system of any previous or subsequent Example, wherein the processor is configured to execute further processor-executable instructions stored in the non-transitory computer-readable medium to: grant, by the video conference provider, host controls of the identification session to the authorized agency device; and transmit, by the video conference provider, a notification that the authorized agency device is the host of the identification session to the one or more client devices in the identification session.

Example 37 is a non-transitory computer-readable medium comprising processor-executable instructions configured to cause one or more processors to: determine, by a video conference provider, a plurality of client devices associated with an incident identification system; join, by the video conference provider, one or more of the plurality of client devices to an identification session; receive, by the video conference provider, at least one multimedia stream from each of the one or more client devices; monitor, by the video conference provider, the received multimedia streams for one or more incident factors; identify, by the video conference provider, an incident factor in the received multimedia streams; and generate, by the video conference provider, an incident alert for an incident event based on identifying the incident factor.

Example 38 is the non-transitory computer-readable medium of any previous or subsequent Example, wherein the instructions to monitor, by the video conference provider, the received multimedia streams for one or more incident factors further comprise processor-executable instructions stored in the non-transitory computer-readable medium to: analyze the received multimedia streams for the one or more incident factors, wherein the one or more incident factors comprise one or more of: one or more keywords; one or more audio signatures; an increase in audio activity; an increase in visual activity; or one or more visual signatures.

Example 39 is the non-transitory computer-readable medium of any previous or subsequent Example, wherein the processor is configured to execute further processor-executable instructions stored in the non-transitory computer-readable medium to: responsive to the incident alert for the incident event, transmit, by the video conference provider, a request to join an authorized agency device to the identification session; and join, by the video conference provider, the authorized agency device to the identification session.

Example 40 is the non-transitory computer-readable medium of any previous or subsequent Example, wherein the processor is configured to execute further processor-executable instructions stored in the non-transitory computer-readable medium to: generate, by the video conference provider, a snippet of a multimedia stream comprising the one or more incident factors identified by the video conference provider; and transmit, to the authorized agency device, the snippet of the multimedia stream comprising the one or more incident factors.

Example 41 is the non-transitory computer-readable medium of any previous or subsequent Example, wherein the received multimedia streams comprises a first audio stream from a first client device, and the instructions to identify, by the video conference provider, the incident factor in the received multimedia streams further comprise processor-executable instructions stored in the non-transitory computer-readable medium to: perform speech recognition on the first audio stream; and identify, based on the speech recognition, one or more keywords indicating the one or more incident factors are present.

Example 42 is the non-transitory computer-readable medium of any previous or subsequent Example, wherein the processor is configured to execute further processor-executable instructions stored in the non-transitory computer-readable medium to: receive, from the authorized agency device, a request to control equipment corresponding to a first multimedia stream transmitted from a first client device of the one or more client devices; transmit, by the video conference provider, a signal to the first client device to control the equipment corresponding to the first multimedia stream; and receive, by the video conference provider, a modified first multimedia stream from the first client device based on the signal to control the equipment corresponding to the first multimedia stream.

Example 43 is a method comprising: determining, by a video conference provider, a plurality of client devices associated with an incident identification system; joining, by the video conference provider, one or more of the plurality of client devices to an identification session; receiving, by the video conference provider, at least one multimedia stream from each of the one or more client devices; identifying, by the video conference provider, one or more identifying characteristics in a first multimedia stream from the received multimedia streams; obtaining, by the video conference provider, a set of one or more monitored identifying characteristics from a database; and generating, by the video conference provider, an incident alert based on the one or more identifying characteristics and the set of one or more monitored identifying characteristics.

Example 44 is the method of any previous or subsequent Example, wherein the incident identification system is established in response to receiving a request from an administrator of a facility where an incident event has occurred.

Example 45 is the method of any previous or subsequent Example, the method further comprising: comparing, by the video conference provider, the one or more identifying characteristics to the set of one or more monitored identifying characteristics; and determining, by the video conference provider, that the one or more identifying characteristics correspond to an incident event based on the comparison.

Example 46 is the method of any previous or subsequent Example, wherein determining, by the video conference provider, that the one or more identifying characteristics correspond to the incident event further comprises at least one of: determining, by the video conference provider, that there is a match between the one or more identifying characteristics and the set of one or more monitored identifying characteristics; or determining, by the video conference provider, that there is not a match of the one or more identifying characteristics to the set of one or more monitored identifying characteristics.

Example 47 is the method of any previous or subsequent Example, the method further comprising: responsive to the incident alert, transmitting, by the video conference provider, a request to join an authorized agency device to the identification session; and joining, by the video conference provider, the authorized agency device to the identification session.

Example 48 is the method of any previous or subsequent Example, further comprising: receiving, by the video conference provider, an identifying characteristic; and adding, by the video conference provider, the identifying characteristic to the set of one or more monitored identifying characteristics in the database.

Example 49 is the method of any previous or subsequent Example, wherein identifying, by the video conference provider, one or more identifying characteristics in the first multimedia stream from the received multimedia streams comprises: performing, by the video conference provider, visual recognition on each of the received multimedia streams; and identifying, based on the visual recognition, the one or more identifying characteristics in the first multimedia stream.

Example 50 is the method of any previous or subsequent Example, wherein identifying, by the video conference provider, one or more identifying characteristics in the first multimedia stream from the received multimedia streams comprises: performing, by the video conference provider, audio recognition on each of the received multimedia streams; and identifying, based on the audio recognition, the one or more identifying characteristics in the first multimedia stream.

Example 51 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: determine, by a video conference provider, a plurality of client devices associated with an incident identification system; join, by the video conference provider, one or more of the plurality of client devices to an identification session; receive, by the video conference provider, at least one multimedia stream from each of the one or more client devices; identify, by the video conference provider, one or more identifying characteristics in a first multimedia stream from the received multimedia streams; obtain, by the video conference provider, a set of one or more monitored identifying characteristics from a database; and generate, by the video conference provider, an incident alert based on the one or more identifying characteristics and the set of one or more monitored identifying characteristics.

Example 52 is the system of any previous or subsequent Example, wherein the processor is configured to execute further processor-executable instructions stored in the non-transitory computer-readable medium to: compare, by the video conference provider, the one or more identifying characteristics to the set of one or more monitored identifying characteristics; and determine, by the video conference provider, that the one or more identifying characteristics correspond to an incident event based on the comparison.

Example 53 is the system of any previous or subsequent Example, wherein the processor is configured to execute further processor-executable instructions stored in the non-transitory computer-readable medium to: determine, by the video conference provider, a first location of a first client device associated with the first multimedia stream.

Example 54 is the system of any previous or subsequent Example, wherein the processor is configured to execute further processor-executable instructions stored in the non-transitory computer-readable medium to: identify, by the video conference provider, a second multimedia stream from the received multimedia streams based on the one or more monitored identifying characteristics; determine, by the video conference provider, a second location of a second client device associated with the second multimedia stream; and generate, by the video conference provider, a map of the first location and the second location.

Example 55 is the system of any previous or subsequent Example, wherein the processor is configured to execute further processor-executable instructions stored in the non-transitory computer-readable medium to: responsive to the incident alert, transmit, by the video conference provider, a request to join an authorized agency device to the identification session; and join, by the video conference provider, the authorized agency device to the identification session.

Example 56 is the system of any previous or subsequent Example, wherein the processor is configured to execute further processor-executable instructions stored in the non-transitory computer-readable medium to: transmit, by the video conference provider, the map of the first location and the second location to the authorized agency device.

Example 57 is the system of any previous or subsequent Example, wherein the processor is configured to execute further processor-executable instructions stored in the non-transitory computer-readable medium to: determine, by the video conference provider, a second client device within a predetermined vicinity of the first location; and transmit, to the second client device, a request to join the identification session, wherein the one or more client devices do not include the second client device.

Example 58 is a non-transitory computer-readable medium comprising processor-executable instructions configured to cause one or more processors to: determine, by a video conference provider, a plurality of client devices associated with an incident identification system; join, by the video conference provider, one or more of the plurality of client devices to an identification session; receive, by the video conference provider, at least one multimedia stream from each of the one or more client devices; identify, by the video conference provider, one or more identifying characteristics in a first multimedia stream from the received multimedia streams; obtain, by the video conference provider, a set of one or more monitored identifying characteristics from a database; and generate, by the video conference provider, an incident alert based on the one or more identifying characteristics and the set of one or more monitored identifying characteristics.

Example 59 is the non-transitory computer-readable medium of any previous or subsequent Example, wherein the processor is configured to execute further processor-executable instructions stored in the non-transitory computer-readable medium to: compare, by the video conference provider, the one or more identifying characteristics to the set of one or more monitored identifying characteristics; determine, by the video conference provider, a match confidence of the one or more identifying characteristics to the set of one or more monitored identifying characteristics; and generate, by the video conference provider, the incident alert based on the match confidence.

Example 60 is the non-transitory computer-readable medium of any previous or subsequent Example, wherein the processor is configured to execute further processor-executable instructions stored in the non-transitory computer-readable medium to: responsive to the incident alert, transmit, by the video conference provider, a request to join an authorized agency device to the identification session; and join, by the video conference provider, the authorized agency device to the identification session.

Example 61 is the non-transitory computer-readable medium of any previous or subsequent Example, wherein the processor is configured to execute further processor-executable instructions stored in the non-transitory computer-readable medium to: determine, by the video conference provider, a first location of a first client device associated with the first multimedia stream; and transmit, by the video conference provider, a signal to control equipment of the first client device corresponding to the first multimedia stream.

Example 62 is the non-transitory computer-readable medium of any previous or subsequent Example, wherein the instructions to identify, by the video conference provider, the one or more identifying characteristics in the first multimedia stream further comprise processor-executable instructions stored in the non-transitory computer-readable medium to: analyze each of the received multimedia streams for one or more of: one or more keywords; one or more audio signatures; or one or more visual signatures.

Example 63 is the non-transitory computer-readable medium of any previous or subsequent Example, wherein the processor is configured to execute further processor-executable instructions stored in the non-transitory computer-readable medium to: receive, by the video conference provider, a identifying characteristic; and add, by the video conference provider, the identifying characteristic to the set of one or more monitored identifying characteristics in the database.

That which is claimed is:

1. A method comprising:

establishing, by a video conference provider, an incident identification system;

determining, by the video conference provider, a plurality of user client devices enrolled in the incident identification system, each of the user client devices located within a facility;

joining, by the video conference provider, one or more of the plurality of user client devices to an identification session without any input from the user client devices, the identification session comprising a video conference hosted by the video conference provider;

receiving, by the video conference provider, at least one multimedia stream from each of the one or more user client devices;

determining, by the video conference provider, a relevant multimedia stream from the received multimedia streams; and transmitting, by the video conference provider, an indication to increase a prominence of the relevant multimedia stream during the identification session.

2. The method of claim 1, wherein the incident identification system is established in response to receiving a request from an administrator of the facility where an incident event has occurred.

3. The method of claim 1, wherein determining, by the video conference provider, the relevant multimedia stream comprises:

identifying, by the video conference provider, one or more incident factors present in a first multimedia stream of the received multimedia streams; and determining, by the video conference provider, the first multimedia stream to be relevant based on the one or more incident factors.

4. The method of claim 3, wherein the first multimedia stream comprises a first audio stream, and wherein identifying, by the video conference provider, the one or more incident factors present in the first multimedia stream comprises:

performing speech recognition on the first audio stream; and identifying, based on the speech recognition, one or more keywords indicating the one or more incident factors are present in the first audio stream.

5. The method of claim 3, wherein the first multimedia stream comprises a first video stream, and wherein identifying, by the video conference provider, the one or more incident factors present in the first multimedia stream comprises:

performing visual recognition on the first video stream; and identifying, based on the visual recognition, visual activity indicating the one or more incident factors are present in the first video stream.

6. The method of claim 3, wherein the first multimedia stream comprises a first audio stream, and wherein identifying, by the video conference provider, the one or more incident factors present in the first multimedia stream comprises:

performing audio recognition on the first audio stream; and identifying, based on the audio recognition, audio activity indicating the one or more incident factors are present in the first audio stream.

7. The method of claim 1, the indication to increase a display size of the relevant multimedia stream during the identification session relative to a size of other multimedia streams.

8. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
establish, by a video conference provider, an incident identification system;
determine, by the video conference provider, a plurality of user client devices enrolled in the incident identification system, each of the user client devices located within a facility;
join, by the video conference provider, one or more of the plurality of user client devices to an identification session without any input from the user client devices, the identification session comprising a video conference hosted by the video conference provider;
receive, by the video conference provider, at least one multimedia stream from each of the one or more user client devices;
determine, by the video conference provider, a relevant multimedia stream from the received multimedia streams; and
transmit, by the video conference provider, an indication to increase a prominence of the relevant multimedia stream during the identification session.

9. The system of claim 8, wherein the instructions to determine, by the video conference provider, the relevant multimedia stream further comprise processor-executable instructions stored in the non-transitory computer-readable medium to:
determine, by the video conference provider, a first audio signature and a second audio signature in a first multimedia stream;
identify, by the video conference provider, the first audio signature to be not relevant to the identification session and the second audio signature to be relevant to the identification session; and
determine, by the video conference provider, the first multimedia stream to be relevant.

10. The system of claim 8, wherein the instructions to determine, by the video conference provider, the relevant multimedia stream further comprise processor-executable instructions stored in the non-transitory computer-readable medium to:
analyze, by the video conference provider, the received multimedia streams for one or more incident factors, wherein the one or more incident factors comprise one or more of:
one or more keywords;
one or more audio signatures;
an increase in audio activity;
an increase in visual activity; or
one or more visual signatures; and
determine, by the video conference provider, a multimedia stream to be relevant based on the presence of one or more incident factors in the multimedia stream.

11. The system of claim 10, wherein the processor is configured to execute further processor-executable instructions stored in the non-transitory computer-readable medium to:
responsive to determining the multimedia stream to be relevant, generate, by the video conference provider, an incident alert for an incident event based on the one or more incident factors.

12. The system of claim 11, wherein the processor is configured to execute further processor-executable instructions stored in the non-transitory computer-readable medium to:
responsive to the incident alert for the incident event, transmit, by the video conference provider, a request to join an authorized agency device to the identification session; and
join, by the video conference provider, the authorized agency device to the identification session.

13. The system of claim 12, wherein the identification session comprises at least one breakout room, and wherein the instructions to transmit, by the video conference provider, the indication to increase the prominence of the relevant multimedia stream during the identification session cause the processor to execute further processor-executable instructions stored in the non-transitory computer-readable medium to:
determine, by the video conference provider, a breakout room assignment for the relevant multimedia stream; and
transmit, by the video conference provider, the relevant multimedia stream to the authorized agency device based on the breakout room assignment.

14. The system of claim 8, wherein the processor is configured to execute further processor-executable instructions stored in the non-transitory computer-readable medium to:
determine, by the video conference provider, a location for each of the one or more user client devices;
determine, by the video conference provider, an activity level for a respective multimedia stream for each of the one or more user client devices; and
generate, by the video conference provider, a heat map based on the activity level for each of the respective multimedia streams.

15. A non-transitory computer-readable medium comprising processor-executable instructions configured to cause one or more processors to:
establish, by a video conference provider, an incident identification system;
determine, by the video conference provider, a plurality of user client devices enrolled in the incident identification system, each of the user client devices located within a facility;
join, by the video conference provider, one or more of the plurality of user client devices to an identification session without any input from the user client devices, the identification session comprising a video conference hosted by the video conference provider;
receive, by the video conference provider, at least one multimedia stream from each of the one or more user client devices;
determine, by the video conference provider, a relevant multimedia stream from the received multimedia streams; and
transmit, by the video conference provider, an indication to increase a prominence of the relevant multimedia stream during the identification session.

16. The non-transitory computer-readable medium of claim 15, wherein the processor is configured to execute further processor-executable instructions stored in the non-transitory computer-readable medium to:
join, by the video conference provider, a first authorized agency device to the identification session; and
join, by the video conference provider, a second authorized agency device to the identification session.

17. The non-transitory computer-readable medium of claim 16, wherein the instructions to determine, by the video conference provider, the relevant multimedia stream further comprise processor-executable instructions stored in the non-transitory computer-readable medium to:

identify, by the video conference provider, one or more incident factors present in a first multimedia stream of the received multimedia streams; and determine, by the video conference provider, the first multimedia stream to be the relevant multimedia stream based on the one or more incident factors present in the first multimedia stream.

18. The non-transitory computer-readable medium of claim 17, wherein the instructions to transmit, by the video conference provider, the indication to increase the prominence of the relevant multimedia stream during the identification session further comprise processor-executable instructions stored in the non-transitory computer-readable medium to:

transmit, by the video conference provider, an indication to increase the prominence of the relevant multimedia stream for the first authorized agency device based on the presence of the one or more incident factors.

19. The non-transitory computer-readable medium of claim 17, wherein the one or more incident factors comprise one or more of:

one or more keywords;
one or more audio signatures;
an increase in audio activity;
an increase in visual activity; or
one or more visual signatures.

20. The non-transitory computer-readable medium of claim 17, wherein the received multimedia streams comprises a first audio stream from a first user client devices, and the instructions to identify, by the video conference provider, the one or more incident factors in the first multimedia stream further comprise processor-executable instructions stored in the non-transitory computer-readable medium to:

perform speech recognition on the first audio stream from the first user client devices; and identify, based on the speech recognition, one or more keywords indicating the one or more incident factors.

* * * * *